(12) United States Patent
Speicher

(10) Patent No.: US 6,697,786 B2
(45) Date of Patent: *Feb. 24, 2004

(54) INTEGRATED AUDIOTEXT-INTERNET PERSONAL AD SERVICES

(76) Inventor: Gregory J. Speicher, 651F Lakeview Plaza Blvd., Worthington, OH (US) 43085

(*) Notice: Subject to any disclaimer, the term of this patent is extended or adjusted under 35 U.S.C. 154(b) by 76 days.

This patent is subject to a terminal disclaimer.

(21) Appl. No.: 09/933,572

(22) Filed: Aug. 20, 2001

(65) Prior Publication Data

US 2002/0123929 A1 Sep. 5, 2002

Related U.S. Application Data

(60) Continuation of application No. 08/965,517, filed on Nov. 6, 1997, now Pat. No. 6,282,515, which is a division of application No. 08/744,879, filed on Nov. 8, 1996, now abandoned.

(51) Int. Cl.⁷ .............................................. G06F 17/60
(52) U.S. Cl. ....................................................... 705/14
(58) Field of Search ............................................ 705/14

(56) References Cited

U.S. PATENT DOCUMENTS 5,996,006 A * 11/1999 Speicher ...................... 709/218
6,022,315 A * 2/2000 Iliff ............................... 600/300
6,282,515 B1 * 8/2001 Speicher ......................... 705/14

FOREIGN PATENT DOCUMENTS

EP     852872 A1 *  7/1998

OTHER PUBLICATIONS

"Digital Ink chooses Ziff–Davis for delivery of The Washington Post online service", PR Newswire, Mar. 16, 1994.*

* cited by examiner

Primary Examiner—Eric W. Stamber
Assistant Examiner—Donald L. Champagne
(74) Attorney, Agent, or Firm—Ward & Olivo

(57) ABSTRACT

The present invention relates to a method and apparatus for delivering personal ad services which substantially eliminate or reduce the disadvantages and problems associated with prior systems that deliver such personal ad services. In the use of such services, the need is recognized for improved capability regarding the features available to Internet users, and the integration of audiotex personal ad services and Internet personal ad services. With the present invention, a personal ad published in a newspaper includes graphical icons which denote if an ad has additional text or multimedia files (a photograph or a video clip) available on the Internet. With respect to personal ad services, the present invention provides the needed improved capability regarding the features available to Internet users, and the integration of audiotex personal ad services and Internet personal ad services.

19 Claims, 14 Drawing Sheets

OUTGOING AND FUN     87654

I AM A SINGLE WHITE FEMALE, AGE 25, WHO ENJOYS MOVIES, DINING OUT, TRAVEL AND THE OUTDOORS. I WORK AS A SECRETARY AT A LAW OFFICE AND LOVE MY JOB. I'M LOOKING FOR AN ATTRACTIVE SINGLE WHITE MALE, AGE 25 TO 30, FOR FRIENDSHIP AND POSSIBLE ROMANCE.

2004  2001

NICE GUYS FINISH FIRST     45378

I AM A DIVORCED BLACK MALE, AGE 40, AND AM NEW TO THE AREA. I WAS RECENTLY TRANSFERRED HERE BY MY COMPANY AND AM LOOKING FOR A NEW FRIEND. I'M SEEKING A NICE BLACK FEMALE WHO CAN SHOW ME AROUND.

2005   2002

URBAN COWBOY     67672

I AM A SINGLE WHITE MALE WHO LOVES COUNTRY MUSIC AND THE OUTDOORS. I HAVE A SMALL HORSE FARM OUTSIDE OF TOWN I WOULD LOVE TO SHOW THAT SPECIAL SOMEONE. I ALSO ENJOY COOKING, HIKING, SWIMMING, AND TENNIS. I'M LOOKING FOR SOMEONE WITH SIMILAR INTERESTS.

2003

| | |
|---|---|
| 🖥️ | AD PLACED VIA INTERNET |
| 📠 | AD PLACED VIA TELEPHONE |
| ✏️ | ADDITIONAL TEXT ON INTERNET |
| 📷 | PHOTO AVAILABLE ON INTERNET |
| 🎤 | AUDIO AVAILABLE VIA TELEPHONE |
| 📹 | VIDEO AVAILABLE ON INTERNET |

FIG. 2
AD PERSONAL TABLE

| FIELD NAME | REF. # | DESCRIPTION |
|---|---|---|
| AD_MAILBOX_NUMBER | 201 | THE FIVE DIGIT MAILBOX NUMBER ASSIGNED TO THE AD. THE MAILBOX NUMBER IS USED FOR VOICE MAILBOX E-MAIL ADDRESSES. |
| AD_PASSWORD | 202 | THE ADVERTISERS 5 DIGIT PASSWORD |
| AD_PHONE | 203 | THE ADVERTISERS PHONE NUMBER |
| AD_EMAIL_ADDRESS | 204 | THE OPTIONAL E-MAIL ADDRESS OF THE ADVERTISER. THE AD E-MAIL ADDRESS WILL ONLY BE USED TO NOTIFY THE ADVERTISER THAT A RESPONSE HAS OCCURRED. |
| AD_EMAIL_FILENAME | 205 | THE FILENAME OF THE E-MAIL AUDIO FILE RECEIVED FROM THE CLIENT |
| AD_DATE | 206 | THE DATE THE AD IS PLACED |
| AD_GENDER | 207 | THE GENDER OF AN ADVERTISER |
| AD_MARITAL_STATUS | 208 | THE MARITAL STATUS OF AN ADVERTISER |
| AD_AGE | 209 | THE AGE OF AN ADVERTISER |
| AD_REVIEW_FLAG | 210 | SET TO FALSE TO INDICATE THAT THE AD NEEDS TO BE REVIEWED. |
| AD_ORIGIN | 211 | WHERE DID THE AD ORIGINATE? IVR OR IWS |

FIG. 3
AD GREETINGS TABLE

| FIELD NAME | REF. # | DESCRIPTION |
|---|---|---|
| GR_MAILBOX_NUMBER | 301 | THE FIVE DIGIT MAILBOX NUMBER ASSIGNED TO THE AD. THE AD NUMBER IS ALSO USED AS THE VOICE MAILBOX ADDRESS AND FOR THE E-MAIL ADDRESS. |
| GR_TYPE | 302 | THE TYPE OF GREETING STORED (TEXT, VOX, WAV, REALAUDIO, PHOTO, ETC..). |
| GR_REVIEW_FLAG | 303 | THE FLAG THAT DENOTES THE FILE HAS BEEN REVIEWED (INITIALLY SET TO FALSE). |
| GR_FILENAME | 304 | THE FILENAME OF A GREETING (GREETING1, GREETING2, ETC..). |
| GR_DATE_TIME | 305 | DATE AND TIME THE GREETING WAS POSTED TO THE DATABASE. |
| GR_CONVERSION_FLAG | 306 | SET TO FALSE IF THE FILE IS TO BE CONVERTED TO ANOTHER FORMAT. |

FIG. 4
AD RESPONSE TABLE

| FIELD NAME | REF. # | DESCRIPTION |
|---|---|---|
| RSP_MAILBOX_NUMBER | 501 | THE FIVE DIGIT MAILBOX NUMBER ASSIGNED TO THE AD. THE MAILBOX NUMBER IS ALSO USED FOR THE VOICE MAILBOX ADDRESS AND FOR THE E-MAIL ADDRESS. |
| RSP_DATE_TIME | 503 | THE DATE THE RESPONDENT ENTERED THE FILE INTO THE DATABASE. |
| RSP_TYPE | 504 | THE TYPE OF RESPONSE FILE (TEXT, VOX, WAV, REALAUDIO, ETC..). |
| RSP_FILENAME | 505 | THE FILENAME OF A RESPONSE, INCLUDING TEXT FILES (GREETING1, GREETING2, ETC..). |
| RSP_CONVERSION_FLAG | 506 | SET TO FALSE IF THE FILE IS TO BE CONVERTED TO ANOTHER FORMAT. |

FIG. 8

OUTGOING AND FUN   87654

I AM A SINGLE WHITE FEMALE, AGE 25, WHO ENJOYS MOVIES, DINING OUT, TRAVEL AND THE OUTDOORS. I WORK AS A SECRETARY AT A LAW OFFICE AND LOVE MY JOB. I'M LOOKING FOR AN ATTRACTIVE SINGLE WHITE MALE, AGE 25 TO 30, FOR FRIENDSHIP AND POSSIBLE ROMANCE.

2004   2001

URBAN COWBOY   67672

I AM A SINGLE WHITE MALE WHO LOVES COUNTRY MUSIC AND THE OUTDOORS. I HAVE A SMALL HORSE FARM OUTSIDE OF TOWN I WOULD LOVE TO SHOW THAT SPECIAL SOMEONE. I ALSO ENJOY COOKING, HIKING, SWIMMING, AND TENNIS. I'M LOOKING FOR SOMEONE WITH SIMILAR INTERESTS.

2003

AD PLACED VIA INTERNET
AD PLACED VIA TELEPHONE
ADDITIONAL TEXT ON INTERNET
PHOTO AVAILABLE ON INTERNET
AUDIO AVAILABLE VIA TELEPHONE
VIDEO AVAILABLE ON INTERNET

NICE GUYS FINISH FIRST   45378

I AM A DIVORCED BLACK MALE, AGE 40, AND AM NEW TO THE AREA. I WAS RECENTLY TRANSFERRED HERE BY MY COMPANY AND AM LOOKING FOR A NEW FRIEND. I'M SEEKING A NICE BLACK FEMALE WHO CAN SHOW ME AROUND.

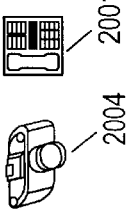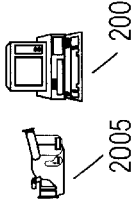

2005   2002

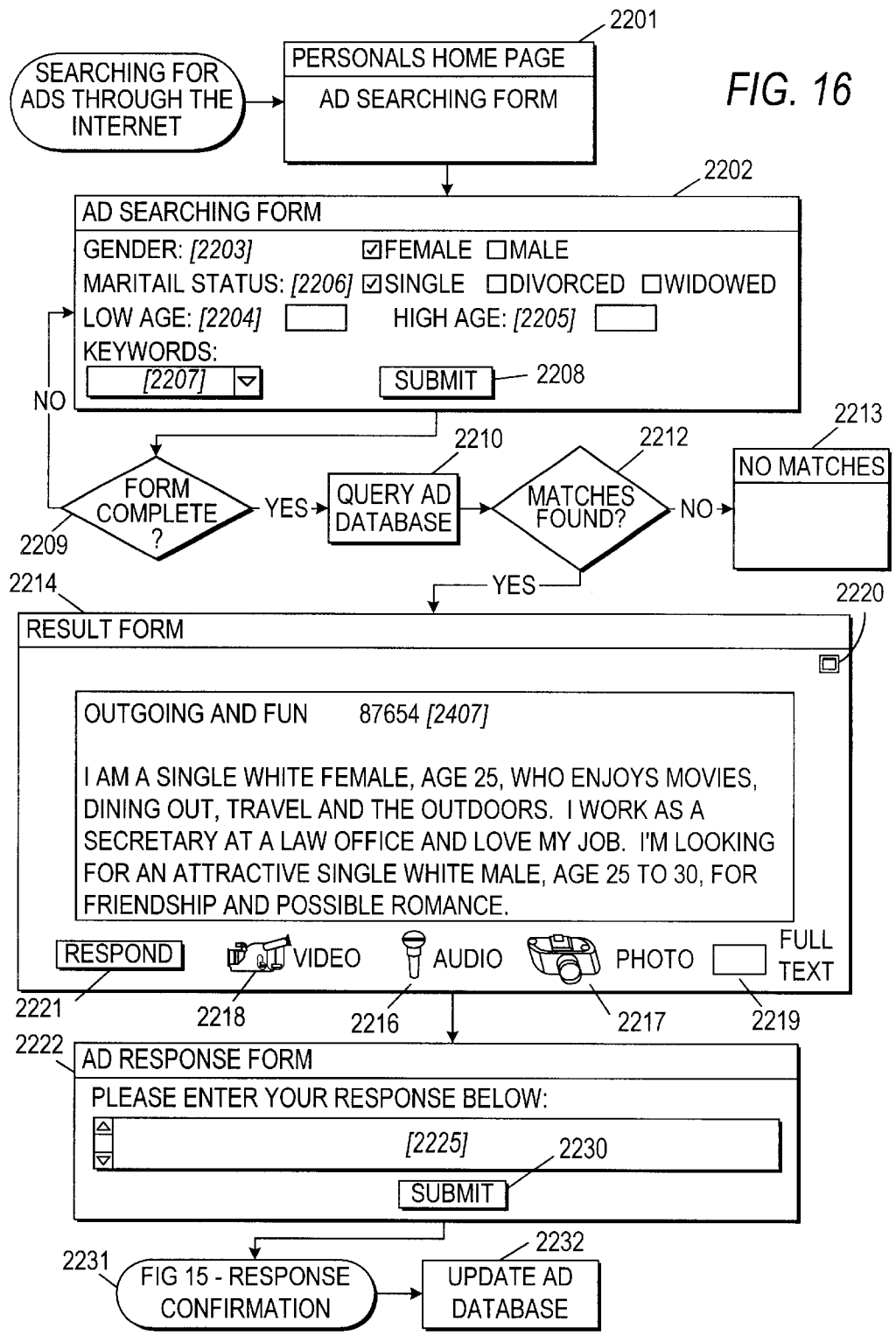

US 6,697,786 B2

INTEGRATED AUDIOTEXT-INTERNET PERSONAL AD SERVICES

CROSS-REFERENCE TO RELATED APPLICATIONS

This application is a continuation of application Ser. No. 08/965,517, filed Nov. 6, 1997, now U.S. Pat. No. 6,282,515, which is a division of application Ser. No. 08/744,879, filed Nov. 8, 1996, now abandoned.

TECHNICAL FIELD OF THE INVENTION

The present invention relates to audiotex systems designed to provide full access to traditional databases and telecommunications systems, such as local area networks, the Internet, other external databases, telephones and fax machines, etc., and more specifically to audiotext personal ad services.

BACKGROUND OF THE INVENTION

Audiotex personal ad services are a popular way for people to meet, and are available in most newspapers and on many cable television systems. In a typical service, an advertiser calls a live operator and places a text personal ad. An advertiser then calls an audiotex system and records an audio message, often referred to as a greeting, which expands upon the advertiser's text ad by describing in more detail the advertiser and the type of person he is seeking. Personal ads are then published in a newspaper. A personal ad includes a 900 telephone number and an ad mailbox number permitting a caller to listen to an advertiser's voice greeting. A caller can respond to an ad by recording a reply voice mail message for the advertiser. An advertiser retrieves a message by calling the audiotex system and entering a password given at the time of ad placement. In another format, no live operator is used. An advertiser first records an audio greeting. An operator then listens to the audio greetings off-line and writes a text summary of each audio greeting for publication in the newspaper.

With the expansion of the Internet and other on-line services, personal ad services have been created to take advantage of this new medium. A typical service allows an advertiser to place a text personal ad that is published on the Internet on an HTML (HyperText Markup Language) page. An Internet user may respond to a personal ad by sending an advertiser a message via electronic mail. The limitation of this approach is that an Internet user cannot listen to an audio recording of an advertiser, a feature that is central to audiotex personal ad services. Another limitation is that most people do not have Internet access, thus limiting the number of advertisers and respondents.

In another format, an attempt is made to integrate audiotex personal ads services with the Internet. Using this approach, a newspaper publishes personal ads in both the newspaper and on the Internet. Each personal ad includes a 900 telephone number and an ad mailbox number permitting a caller to listen to an advertiser's voice greeting. This approach still has the disadvantage of not allowing an Internet user to listen to an advertiser's voice greeting via the Internet. Moreover, an Internet user can only respond to a personal ad via a telephone.

As the use of audiotex services has grown steadily, related telephonic communication techniques have also expanded. In that regard, telephone systems have been developed that permit telephone callers to exchange telephone messages. At the same time, the Internet has made possible the interaction of large numbers of personal computers. Thus, on the one hand, the public telephone network exists as a principal means of voice communication, while the Internet is the major large scale choice for sharing digital data.

To date, both the public telephone network and the Internet have been used for both the sharing of voice files and data files. For example, placing telephone calls via the Internet is possible, while data files are often transferred via the public telephone network. Indeed, most people use the public telephone network to access the Internet. However, a system that optimizes the interaction between the public telephone network and the Internet is elusive. For example, in the voice personals industry, service bureaus provide "800" and "900" numbers for callers to access stored voice files, for exchanging information so that matches can be made, and hence, people can date one another. In that industry, service bureaus often use voice boards, such as those provided by Dialogic Corporation, to answer telephone calls, store and access voice files, and match callers with other voice messages.

Conversely, among Internet users, text messages are stored on a database, and then, users enter various web sites to access messages on diverse so-called bulletin boards or databases. In essence, abstracts of databases can be searched so that users can look for interesting sites to browse.

However, to date, there has not been a seamless database interface constructed that allows telephone users of audiotex systems to access Internet messages, and allows Internet users to access audiotex services.

Accordingly, it is desirable to increase the intelligence of a system for processing telephone calls. It is also desirable to increase the flexibility in a system for processing telephone calls. It is also desirable to provide greater interaction between a caller and a system for processing telephone calls. It is also desirable to provide greater accessibility to information from external systems by a system for processing telephone calls. It is also desirable to augment the existing process of directing calls to service agents. It is also desirable to route a caller to the appropriate agent based on information about the caller. It is also desirable to provide routing of a call and its associated data to the appropriate agent. It is also desirable to provide network reliability in routing a caller to the appropriate agent.

Multi-media messaging involves integrating discrete messages or individual message components of different media, e.g., voice, text, video, and the ability to deliver the integrated messages through a single universal mailbox. For example, the integration of voice and facsimile (fax) messages is well known in the art. For example, U.S. Pat. No. 5,008,926, discloses an integrated voice-and-facsimile store-and-forward message system that provides for the sending, storage, and delivery of voice messages, fax messages, fax messages annotated with voice messages, and voice messages annotated with fax messages. The disclosed system additionally provides for display of fax messages on terminal screens, and the conversion of fax printed text messages into voice messages via text-to-speech conversion facilities.

Electronic mail, or e-mail, systems are also well known in the art. They provide for the sending, storage, and delivery between computer terminals of displayable data-text and/or graphics-messages.

Integration of e-mail systems with voice-and-fax message systems is highly desirable. For example, it is becoming common for salesmen to work out of "mobile offices"—their cars—which are equipped normally with telephones, often with fax machines, but generally not with data terminals, yet the salesmen would like to have the capability of receiving in their mobile offices messages sent to them in any form-voice, fax, or e-mail. The integration of fax and e-mail messaging is readily accomplished through conversion of e-mail messages into fax messages for delivery to their recipients. But while fax machines are more likely to be available to mobile recipients of the messages than data terminals, they are not as readily available as telephones. Therefore, it is often preferable to instead accomplish the integration of voice and e-mail messaging through conversion of e-mail messages into voice messages for delivery to their recipients. This type of conversion is also readily accomplished if the e-mail messages constitute text only.

A problem arises, however, when e-mail messages constitute information other than text—such as diagrams, charts, special symbols, computer code fragments, pictures, etc.—which is not suitable for conversion into a voice message. Attempts to convert such data message segments into speech result in unintelligible garble. This may be avoided by simply identifying and discarding the non-voiceable data message segments, but this results in the delivery of an incomplete message to the recipient—an unacceptable result.

To summarize, existing Internet personal ad services are limited in that they lack many of the features available on audiotex personal ad services. Also, existing personal ad services do not provide a means for those using a audiotex personal ad service to effectively communicate with those using an Internet personal ad service and visa versa. Although some attempts have been made to improve and integrate existing services, all personal ad services heretofore known suffer from a number of disadvantages:

(a) Existing systems do not allow an Internet user via a computer connected to the Internet to listen to an audio greeting from an audiotex personal ad service.
(b) Existing systems do not allow an Internet user to record an audio greeting via a computer connected to the Internet that can be listened to by other Internet users via the Internet.
(c) Existing services do not allow an advertisers to record an audio greeting via a computer connected to the Internet that can be listened to from a telephone.
(d) Existing services do not allow an advertiser to place a personal ad on an audiotex personal ad service and receive a message on the Internet via electronic mail.
(e) Existing services do not allow a telephone caller to access a text personal ad placed on the Internet.
(f) Existing services do not allow an Internet advertiser to receive a response message from a telephone caller.
(g) Existing services do not allow a telephone caller to retrieve a text message left in response to her personal ad.
(h) Existing services do not allow a telephone caller to retrieve audio messages left in response to her personal ad where said audio responses are left via a computer connected to the Internet.
(i) Existing personal ad services that publish personal ads in a newspaper or on a cable television show limit the number of words of a text personal ad.

In the use of such services, the need is recognized for improved capability regarding the features available to Internet users, and the integration of audiotex personal ad services and Internet personal ad services.

SUMMARY AND OBJECTS OF THE PRESENT INVENTION

The present invention contemplates that audiotex systems will be retrofitted with an input/outport interface which accesses computer databases such as the Internet. In real time, or in a batched mode search and store operation, an audiotex system accesses those databases of interest to it. For example, an audiotex system established for dating services will be equipped with an information translator suitable for accessing databases and/or web sites on the Internet. In that manner, the audiotex system, which stores user input digitized messages, can expand its capability or messages at its disposal by accessing databases.

In general, the present invention is based on recognizing the need to allow a seamless exchange of messages and personal advertisements between traditional audiotex personals services and Internet or on-line based personals services. In addition, the present invention recognizes the need for Internet personals services to offer enhanced features that give on-line users the ability to exchange voice messages on-line.

The present invention comprises the integration of an audiotex system and a web server. As with traditional audiotex personals services, this allows individuals to place a personal advertisement in the form of a digital audio recording that can be listened to and responded to by other individuals calling the audiotex system. Now, for the first time, the digital audio recording of the personal advertisement is also available on the Internet or similar on-line service. On-line users can now listen to the digital audio recording entirely on-line by either downloading the audio file or by listening to it in real time. On-line users respond to these ads by recording a digital audio message that is forwarded to the advertisers' audiotex voice mailboxes. Thus, the invention accommodates on-line users with varying degrees of multi-media computing capabilities.

Conversely, an on-line user places a personal advertisement on-line by typing a text ad that can be published in the external media (newspaper or television cable show, for example) and recording a digital audio message that is available to both on-line and on a traditional audiotex system through the use of synthesized (text to speech) speech. (On-line user could also be given a telephone number to call to complete their ad by recording a digital audio message.) Audiotex users and on-line users respond to Internet ads by recording a digital audio message that is forwarded to the on-line advertiser via electronic mail. The on-line advertiser can listen to the digital audio response in real time or download the audio file. If the Internet advertiser lacks sufficient multimedia capability, response is converted to a text message (speech to text) for inclusion with the electronic mail message.

In accordance with the present invention, a method and apparatus for delivering personal ad services are provided which substantially eliminate or reduce the disadvantages and problems associated with prior systems that deliver such personal ad services.

In the use of such services, the need is recognized for improved capability regarding the features available to Internet users, and the integration of audiotex personal ad services and Internet personal ad services. Several objects and advantages of the present invention are the following:

(a) to allow an Internet user via a computer connected to the Internet to listen to an audio greeting from a audiotex personal ad system. This invention uses compression and data streaming to allow an Internet user to listen to an audio file without downloading. An audio file begins playing while it is being transferred. The advantage is audio that begins playing in real time.
(b) to allow an Internet user to record an audio greeting via a computer connected to the Internet that can be listened to by other Internet users via the Internet.

(c) to allow an advertiser to record an audio greeting via a computer connected to the Internet that can be listened to from a telephone.

(d) to allow an advertiser to place a personal ad via a telephone and receive a message on the Internet via electronic mail.

(e) to allow a telephone caller to access a text personal ad placed on the Internet using text-to-speech whereby a computer uses a synthesized voice to speak text over a telephone.

(f) to allow a telephone caller to respond to a personal ad that is placed via the Internet, where said response can be retrieved via the Internet.

(g) to allow a telephone caller to retrieve a text message left in response to her personal ad by an Internet user by using text-to-speech whereby a computer uses a synthesized voice to speak text over a telephone.

(h) to allow a telephone caller to retrieve an audio message left in response to her personal ad where said audio response is left via a computer connected to the Internet.

(i) to allow an advertiser to have virtually no limit on the number of words in his text personal ad by publishing personal ads on the Internet.

Further objects and advantages are to allow an advertiser to include a photograph and video clip with his personal ad by submitting a file via a computer connected to the Internet. With the present invention, a personal ad published in a newspaper includes graphical icons which denote if an ad has additional text or multimedia files (a photograph or a video clip) available on the Internet. In addition, this invention reduces 800 number or toll charges associated with an advertiser retrieving her messages via a telephone by allowing an advertiser to retrieve her messages on the Internet, thereby eliminating 800 number and toll charges. Still further objects and advantages will become apparent from a consideration of the ensuing description and drawings.

BRIEF DESCRIPTION OF DRAWINGS

For a more complete understanding of the present invention, reference is made to the following drawings, in which:

FIG. 2 shows a table of the fields used for storing personal data, including a brief description of the particular fields.

FIG. 3 shows a table of the fields used for storing greetings data, including a brief description of the particular fields.

FIG. 4 shows a table of the fields used for storing response data, including a brief description of the particular fields.

FIG. 8 shows personal ads as they would appear in a local newspaper.

FIG. 16 shows a flow diagram of an exemplary operation of the process of searching for ads through the Internet as accomplished by the present invention.

DETAILED DESCRIPTION OF THE PREFERRED EMBODIMENT

As required, a detailed illustrative embodiment of the present invention is disclosed herein. However, telephone techniques, physical communication systems, data formats and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
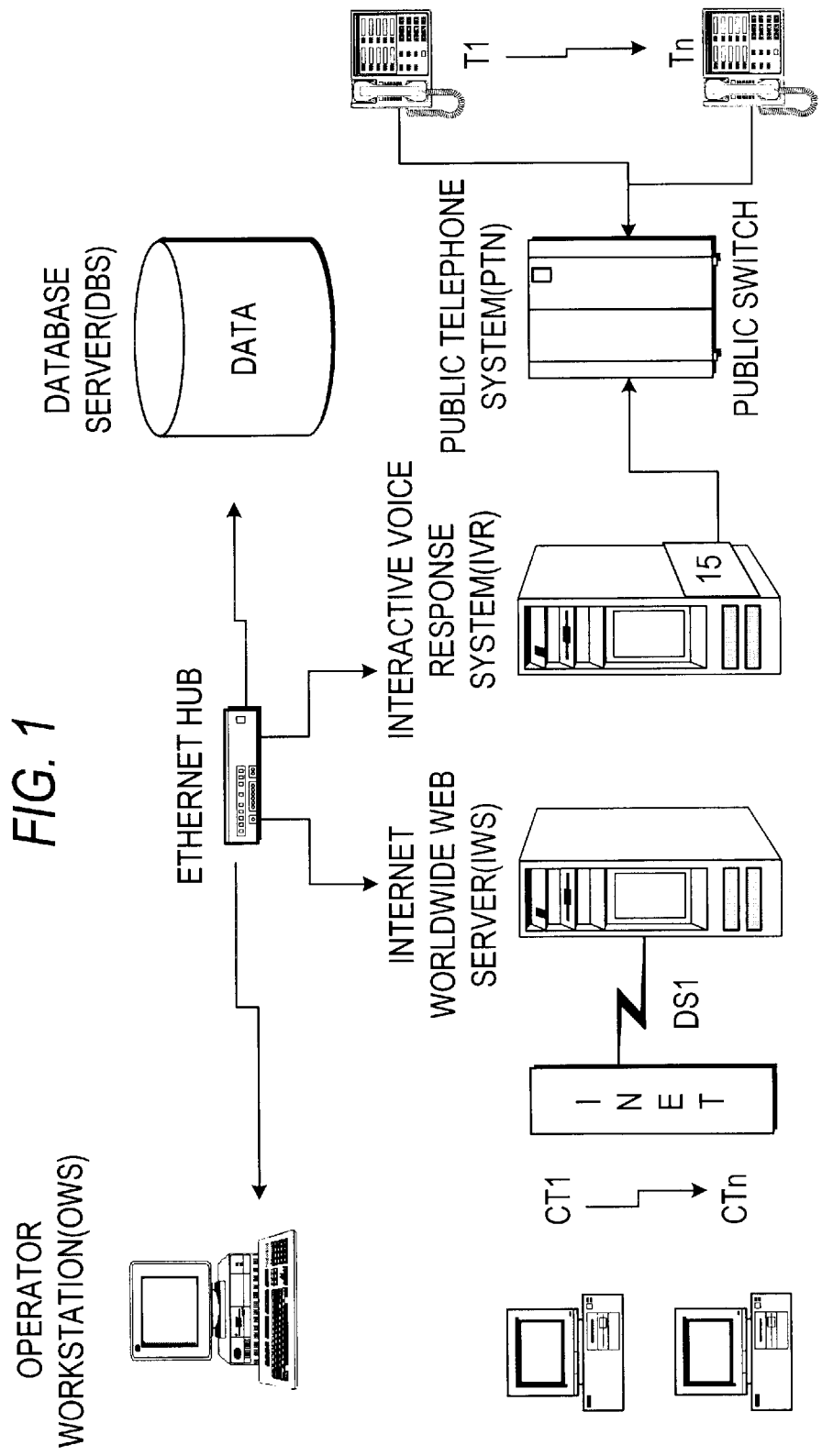
FIG. 1 shows a schematic representation of the present invention.

Referring initially to FIG. 1, a series of remote telephone terminals T1–Tn are represented. In addition, a series of remote computer terminals CT1–CTn are represented. The indicated terminals T1–Tn represent the multitude of telephone terminals existing in association with the public telephone network PTN. The indicated computer terminals CT1–CTn represent the multitude of computer terminals connected to the Internet.

The public telephone network PTN, which accommodates the individual terminals T1–Tn, is coupled to an Interactive Voice Response System IVR. The Internet, which accommodates individual computer terminals CT1–CTn, is coupled to an Internet Web Server IWS. Individual callers use the individual telephone stations T1 through Tn to interface the IVR through the public telephone network PTN. Individual users at computer terminals CT1 through CTn use the Internet to interface the Internet Web Server. Telephone callers and Internet users may record digital audio messages that can be listened to from any of the remote telephone terminals T1–Tn or from any of the remote computer terminals CT1–CTn. Internet users may leave digital text messages that may be accessed from any of the remote telephone terminals T1–Tn using text to speech or from the remote computer terminals CT1–CTn via computer monitor.

Considering the system of FIG. 1 in somewhat greater detail, it is to be understood that the public telephone network has multiplexing capability for individually coupling the terminals T1–Tn to the IVR on request. In the illustrative embodiment of the system, the individual terminals T1–Tn take the form of existing traditional or conventional telephone instruments. It is also to be understood that the Internet has the capability for individually connecting the computer terminals CT1–CTn to the Internet Web Server. In the illustrative embodiment of the system, the individual computer terminals CT1–CTn take the form of personal computers that comprise a central processing unit CPU, modem, monitor, keyboard, hard drive, sound card, and microphone.

Considering the IVR in somewhat greater detail, the public telephone network PTN is coupled to an IVR FIG. 1. In the disclosed embodiment, from the public telephone network PTN, forty-eight lines are connected to the IVR and, accordingly, the IVR may accommodate up to forty-eight simultaneous calls from the public telephone network PTN. The IVR contains a processor, an exemplary form of which is an Intel 166 Mhz Pentium Processor. The forty-eight lines from the public telephone network (PTN) are connected to the processor though an interface 15, an exemplary form of which is a series of commercially available Dialogic (D240SC-T1) cards. The interface incorporates modems, tone decoders, switching mechanisms, DNIS and ANI capability. The Dialogic card stores audio information in the Dialogic .VOX format.

Generally, DNIS capability is a function of the public telephone network PTN to provide digital data indicating the called number. ANI capability is a similar function whereby the digital data indicates the calling number.

Considering the Internet Web Server in somewhat greater detail, the IWS is coupled to the Internet via a DS1 line to a local Internet provider service. The IWS may accommodate a multitude of simultaneous Internet users. As represented, the IWS is a micro computer programmed for Internet information server operations. The IWS contains a processor and Internet server software, exemplary forms of which are an Intel 166 Mhz Pentium Processor and Microsoft Internet Information Server software.

The IWS is also loaded with RealAudio Server software from Progressive Network. RealAudio allows a Microsoft Windows .WAV files to be converted into a RealAudio .RA file, a compressed format that allows play back over the Internet in real time, as opposed to first downloading a file and then listening to it. RealAudio accomplishes this by playing an audio file while it is still downloading, using a process called data streaming.

The IWS is also loaded with VDOLive Server software. VDOLive allows a video clip in the Microsoft Windows AVI, Apple Quicktime, or MPEG video files formats to be converted into a VDOLive .VDO format, a compressed format that allows play back over the Internet in real time, as opposed to first downloading a file and then listening to it. VDOLive also utilizes data streaming.

The IVR and the IWS are coupled to a Database Server DBS via an Ethernet hub as shown in FIG. 1. The system includes one or more Operator Workstations OWS, through which an operator can interact with and control the DBS, IVR and IWS.

The database server DBS is a computer programmed for database operations. In the illustrated embodiment, the DBS manages a personal Ad Database which is comprised of multiple tables that manage ad creation, the audio greeting files, ad response files, photograph and video files. The Ad Database comprises an electronic equivalent of the personal classified ads placed via telephone and the Internet, and responses placed to ads.

In addition, the DBS converts audio files received via telephone into the RealAudio .RA format for real time retrieval via the Internet. Conversely, the DBS converts audio files received via the Internet into Dialogic .VOX files for retrieval via telephone. Audio file conversions are done through audio file conversion software, an exemplary form of which is Vox Studio by Xentec.

The DBS contains a processor and an SQL (Structured Query Language) relational database software, exemplary forms of which are the Intel 166 Mhz Pentium Processor and Microsoft SQL Server.

The Operator Workstation OWS is a conventional personal computer equipped with a sound card capable of playing the audio data and a video display capable of displaying digitally stored photographs and movies. An exemplary form of the OWS is a microcomputer equipped with an Intel 166 Mhz Pentium Processor and a Creative Labs Sound Blaster sound card. Operators review all incoming advertiser files—text, audio, photograph, and video—to insure that their content is appropriate. Also, operators use advertisers' text messages and audio recordings to create summary text ads for publication in a newspaper.

The following sections describe in greater detail the interaction between the IVR, the DBS, the IWS, and the OWS.

Placing a Personal Ad Through a Telephone

Figure 5:
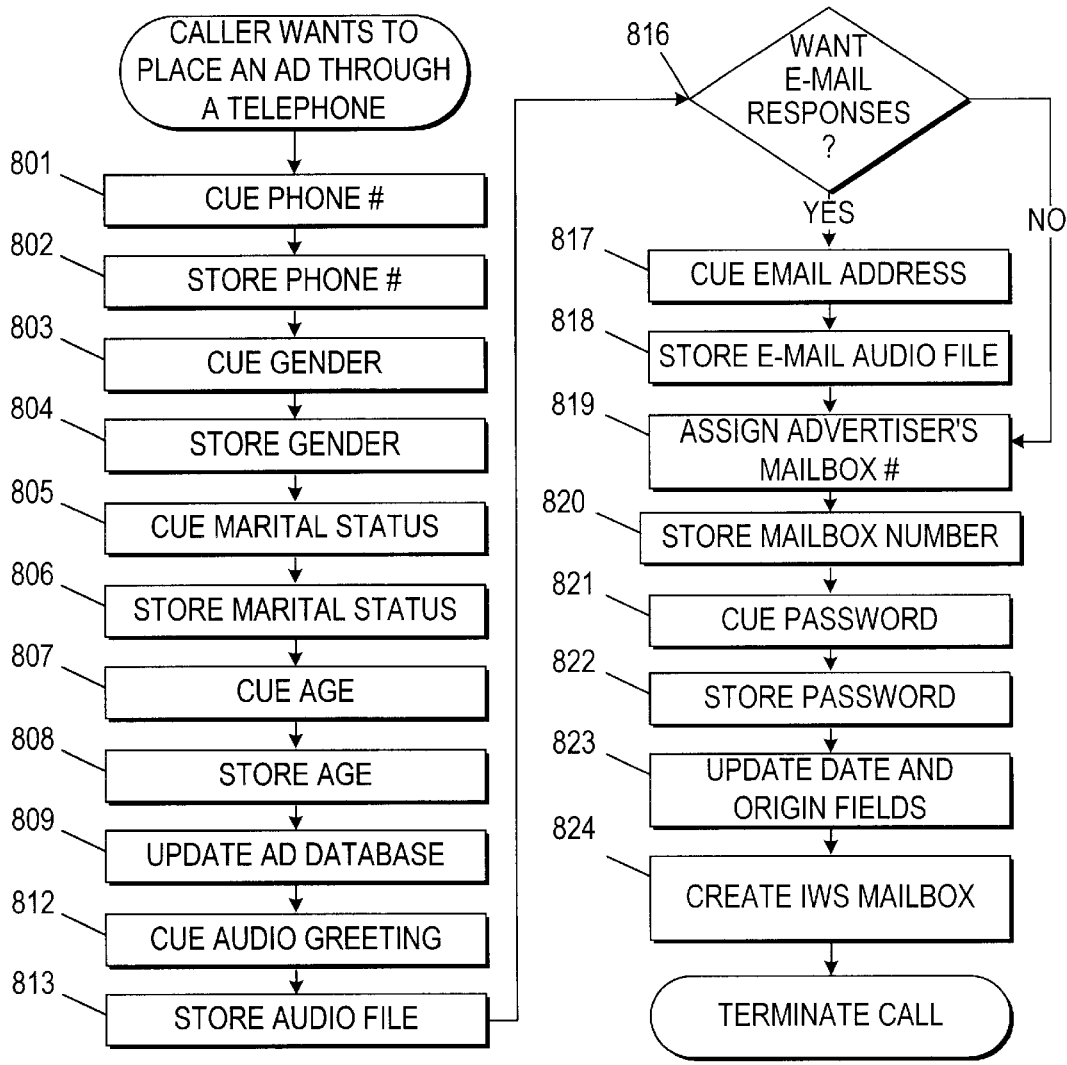
FIG. 5 shows a flow diagram of an exemplary operation of the present invention, more specifically placing an ad through a telephone.

An exemplary operation of the system, with regard to a specific telephone caller placing a personal advertisement will now be treated to accomplish the process as indicated in FIG. 5. First, suppose a telephone caller at terminal T1 makes a call to place a personal advertisement in response to an advertisement in XYZ newspaper. The assumed call involves the telephone caller actuating the buttons to input the number 1 800 555 3333, for example. As a result, signals are provided to the is public telephone network resulting in a connection from the remote terminal T1 to the IVR. Using standard DNIS techniques, the IVR associates the called number 1 800 555 3333 with a specific format, for example, a voice personals ad taking format.

The caller is first prompted to create a profile of himself by answering a series of questions using the buttons on his touch tone phone. Referring initially to FIG. 5, upon receiving a call, the IVR cues the caller to enter his telephone number 801. The IVR stores the telephone number 802 in the field AD_PHONE 203. Next, the IVR cues the caller to enter his gender 803. For example: "If you are a woman, press 1. If you are a man, press 2." The IVR stores the caller's gender 804 in the field AD_GENDER 207. Next, the IVR cues the caller for his marital status 805. For example: "If you are single, press 1. If you are divorced, press 2. If you are widowed, press 3." The caller responds and the IVR stores the caller's marital status 806 in the field AD_MARITAL_STATUS 208. Next, the IVR cues the caller for his age 807. For example: "Please enter your age." The caller's age is then stored 808 in the field AD_AGE 209.

Next, the IVR cues the caller to record an audio greeting 812. The advertiser's audio greeting is then stored to a disk file on the IVR 813 and Ad Database is updated 809. Specifically, the AD_REVIEW_FLAG 210 in the AD_PERSONAL_TABLE FIG. 2 is set to FALSE indicating that the ad must be reviewed by an operator. In addition, a new record is created in the AD_GREETINGS_TABLE FIG. 3 and the field GR_REVIEW_FLAG 303 set to FALSE to indicate that the audio greeting has not been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the format of the audio file, and the location of the audio file on the IVR, and the date and time the greeting was recorded. The field GR_TYPE is set to VOX to indicate that the audio recording is in the Dialogic .VOX file format. Finally, the field GR_CONVERSION_FLAG is set to FALSE to indicate that the audio file must be converted from the Dialogic .VOX format to create a new audio file in the RealAudio .RA format for playback on the Internet.

The IVR then cues the caller to indicate if he wishes to record an e-mail address 816. (The e-mail address is used notify the advertiser via the Internet when someone responds to his ad.) For example "Press 1 to input an e-mail address. Press 2 to decline." If the caller elects to leave an e-mail address, the IVR cues the caller to record his e-mail address 817. The audio recording is stored to a disk file on the IVR 818 and the field AD_EMAIL_FILENAME 205 in table AD PERSONAL FIG. 2 is set, indicating that an e-mail audio file exists and its location on the IVR.

Next, the IVR assigns the advertiser a five digit mailbox number 819. For example: "Your 5-digit mailbox number is 12345." The mailbox number is then stored 820 in the field AD_MAILBOX_NUMBER 201. The IVR then cues the caller to enter a five digit password 821. The password is stored 822 in the field AD_PASSWORD 202.

In addition, the IVR stores the date the ad is taken in the field AD_DATE_TIME 206, and updates the field AD_ORIGIN 211 to indicate that the personal ad originated on the telephone 823. Finally, the IVR creates an electronic mailbox for the advertiser on the IWS 824 and stores it in the field AD_MAILBOX_NUMBER 201 to allow respondents to submit audio, video and photographic files in response to the advertiser's ad.

Placing an Ad Through the Internet

Figure 6:
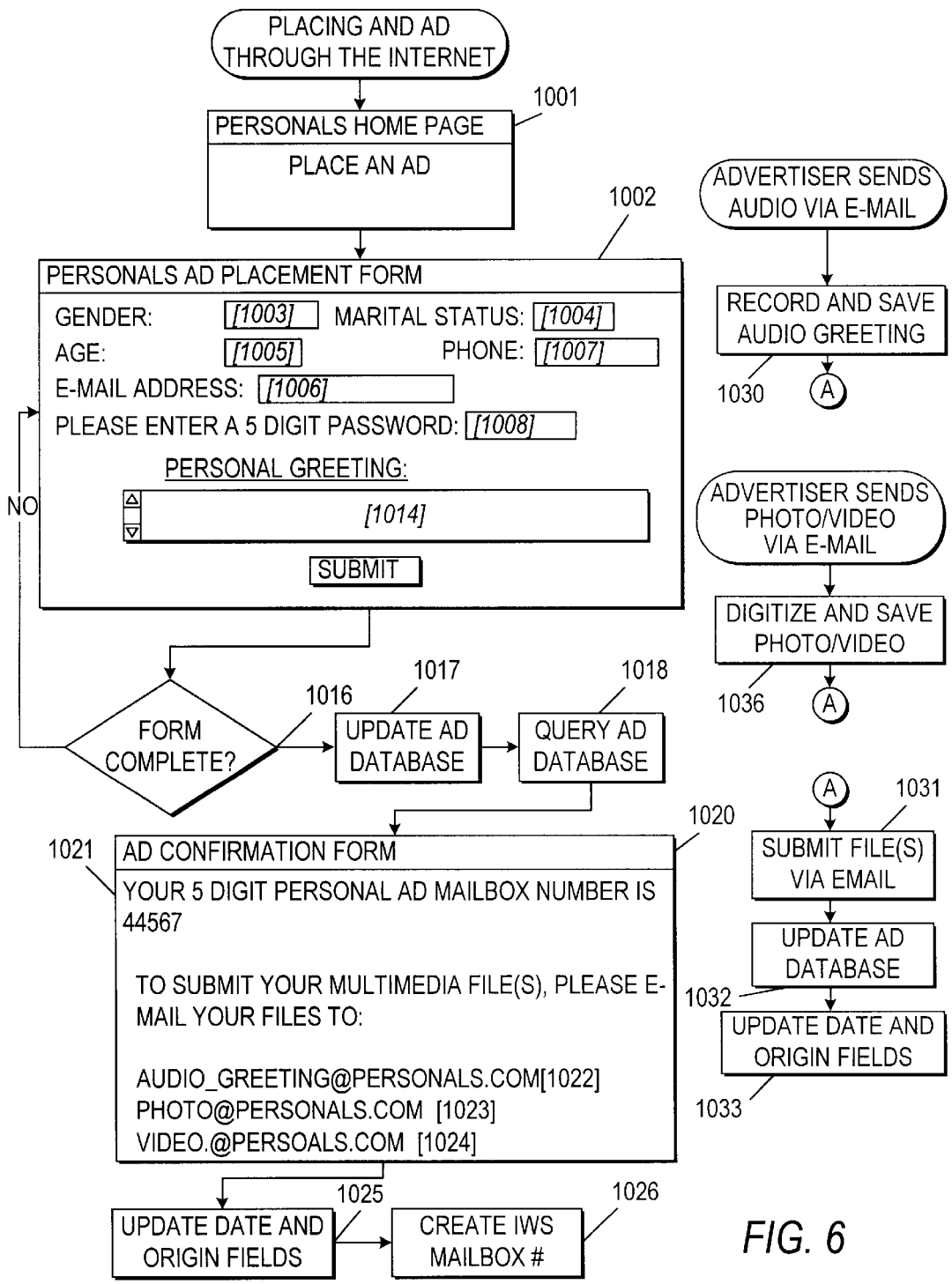
FIG. 6 shows a flow diagram of an exemplary operation of the present invention, more specifically placing an ad through the Internet.

An exemplary operation of the system, with regard to a specific Internet user placing a personal advertisement will now be treated to accomplish the process as indicated in FIG. 6. First, suppose a Internet user at terminal CT1 connects to the Internet to place a personal advertisement in response to an advertisement in XYZ newspaper. The assumed Internet user connects to the Internet and inputs a Uniform Reference Locator URL, for example: http://www.personal_ads.com, resulting in a connection from the remote terminal CT1 to a Home Page 1001 on the Internet Web Server.

Referring to FIG. 6, from the Home Page 1001 on the IWS, the Internet user selects an Ad Placement Form 1002. The Ad Placement Form 1002 contains the following input fields corresponding to fields in the Ad Database as indicated:

| | |
|---|---|
| Gender 1003 | AD_GENDER 207 |
| Marital Status 1004 | AD_MARITAL_STATUS 208 |
| Age 1005 | AD_AGE 209 |
| E-mail address 1006 | AD_EMAIL_ADDRESS 204 |
| Phone Number 1007 | AD_PHONE 203 |
| Password 1008 | AD_PASSWORD 202 |
| Greeting Text 1014 | GR_FILENAME 304 |

This process largely parallels the process of placing a personal ad via a telephone. The password 1008 is used by the advertiser to retrieve messages and the e-mail address 1006 and telephone number 1007 are used to contact the advertiser. The gender 1003, age 1005, and marital status 1004 fields create a profile of the advertiser. Finally, the field Greeting Text 1014 describes the advertiser and the person she is seeking.

The Internet user completes the Ad Placement Form 1002 and presses the "Submit" button to submit her ad. The form is checked by the IWS for completeness 1016. If the form is incomplete, the user is returned to the Ad Placement Form 1002. If the form is complete, the text greeting is then stored to a disk file on the IWS and the Ad Database is updated 1017. Specifically, the AD_REVIEW_FLAG 210 in the AD_PERSONAL_TABLE FIG. 2 is set to FALSE indicating that the ad must be reviewed by an operator. In addition, a new record is created in the AD_GREETINGS_TABLE FIG. 3 and the field GR_REVIEW_FLAG 303 is set to FALSE to indicate that the audio greeting has not been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the file format, and the location of the text file on the IWS, and the date and time the greeting was placed. Specifically, the field GR_TYPE is set to TEXT. Finally, the field GR_CONVERSION_FLAG is set to TRUE to indicate that the text does not need to be converted to a different format.

Lastly, the Internet Web Server creates an Ad Confirmation Page 1020. The Ad Confirmation Page 1020 performs two functions: (1) it confirms the advertiser's mailbox number 1021, and (2) it gives the advertiser instructions on how to include an audio greeting 1022, photograph 1023, or video clip 1024 with her personal ad. Finally, the Internet Web Server stores the date and time the ad is taken in the field AD_DATE_TIME 206, and updates the field AD_ORIGIN 211 to indicate that the personal ad originated on the Internet 1025. In addition, the IWS creates an electronic mailbox for the advertiser and stores it in the field AD_MAILBOX_NUMBER 1026 to allow respondents to submit audio, video and photographic files in response to the advertiser's ad.

Enhancing an Internet Ad With Audio, Photograph and Video

A more detailed explanation of how an advertiser submits an audio greeting, photograph, or video clip via CT1 will now be given. To submit an audio greeting, the advertiser first makes an audio recording using a WAV file editor and then saves the file using her five digit mailbox number as the file name 1030, for example: 44567.wav. The advertiser then submits the audio file using e-mail to an audio greeting electronic mailbox 1031, for example: audio_greeting@personals.com. The advertiser's audio recording is stored to a disk file on the Internet Web Server.

In addition, a new record is created in the AD_GREETINGS_TABLE FIG. 3 and the Ad Database is updated 1032. Specifically, the field GR_REVIEW_FLAG 303 is set to FALSE to indicate that the audio greeting has not been reviewed. Also, the fields GR_MAILBOX_NUMBER 301, GR_TYPE 302, GR_FILENAME 304, GR_DATE_TIME 305 in the AD_GREETINGS_TABLE FIG. 3 are also populated to indicate the advertiser's mailbox number, the format of the audio file, and the location of the audio file on the IWS, and the date and time the greeting placed. The field GR_TYPE is set to WAV to indicate that the audio recording is in the Microsoft .WAV file format. Finally, the field GR_CONVERSION_FLAG is set to FALSE to indicate that the audio file must be converted from the Microsoft .WAV format to create two new audio files: one in the RealAudio .RA format for playback on the Internet, and another in the Dialogic .VOX format for playback via the telephone.

To enhance a personal ad with a photograph, the advertiser first digitizes a photograph using a scanner or takes a photograph with a digital camera and then saves the image to a .GIF file using her five digit mailbox number as the file name 1036, for example: 44567.gif. The advertiser then submits the graphic file using e-mail to an photograph electronic mailbox, for example: photo@personals.com 1031.

The advertiser's photo is stored to a disk file on the IWS and the Ad Database is updated 1031. Specifically, a new record is created in the AD_GREETINGS_TABLE FIG. 3 and the field GR_REVIEW_FLAG 303 set to FALSE to indicate that the graphic file has not been reviewed. In each new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the format of the graphic file, and the location of the graphic file on the IWS, and the date and time the photograph was received. The field GR_TYPE 302 is set to GIF to indicate that the graphic file is in the .GIF file format. Finally, the field GR_CONVERSION_FLAG 306 is set to TRUE to indicate that no file conversion is necessary as .GIF is the graphic file format used by the IWS. If other graphic formats were accepted, they might have to be converted to a .GIF format, depending on the file formats the IWS supported. If file conversion were necessary, the field GR_CONVERSION_FLAG 306 would be set to FALSE.

To enhance a personal ad with video, the advertiser first digitizes a video clip and then saves the image to a Microsoft. AVI file using her five digit mailbox number as the file name 1036, for example: 44567.avi. Other video formats such as Apple Quicktime, or MPEG video could also be used. The advertiser then submits the graphic file using e-mail to an electronic mailbox, for example: video@personals.com 1031.

The advertiser's video clip is stored to a disk file on the IWS and the Ad database is updated 1032.

Specifically, a new record is created in the AD_GREETINGS table FIG. 3 and the field GR_REVIEW_FLAG 303 set to FALSE to indicate that the video file has not been reviewed. In each new record, the fields GR_MAILBOX_NUMBER 301, GR_TYPE 302, GR_FILENAME 304, GR_DATE_TIME 305 in the table AD_GREETINGS FIG. 3 are populated to indicate the advertiser's mailbox number, the format of the video file, and the location of the video file on the IWS, and the date and time the video was received. Specifically, the field GR_TYPE 302 is set to AVI to indicate that the video clip is in the Microsoft .AVI file format. Finally, the field GR_CONVERSION_FLAG 306 is set to FALSE to indicate that the video file must be converted to the VDOLive format for real time playback on the Internet.

Reviewing and Summarizing Ads

All new personal ads are reviewed by an operator at an Operator Workstation to insure that their content is appropriate. Also, each greeting submitted by an advertiser, whether it be an audio greeting recorded by an advertiser via a telephone or a text greeting placed by an advertiser via the Internet, is summarized by an operator to create a twenty word classified text ad for publication in a newspaper. The twenty word limit is a function of newspaper imposed space limitations. It should be noted that space limitations, if they exist at all, may vary widely from newspaper to newspaper. In another format, text ads that are published in the newspaper are first placed with a live operator via a telephone, precluding the need to summarize an audio recording.

Figure 7:
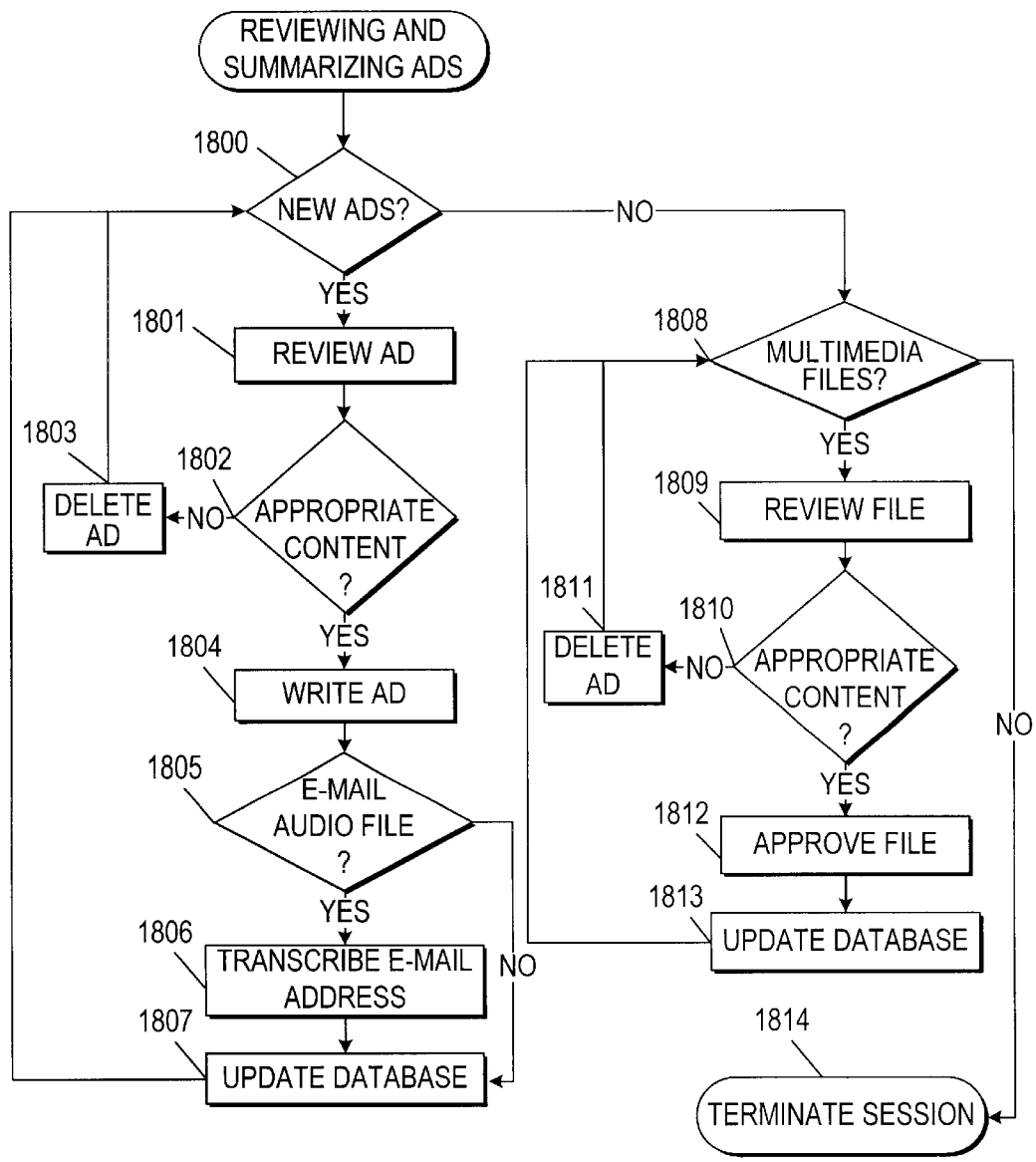
FIG. 7 shows a flow diagram of an exemplary operation of the process of reviewing and summarizing ads as accomplished by the present invention.

An exemplary operation of the process of reviewing and summarizing ads with regard to a specific operator at OWS will now be treated to accomplish the process as indicated in FIG. 7. The operator first queries the database to determine if there are new ads to review 1800. Specifically, the query looks for all ads in the AD_PERSONAL table FIG. 2 where the field AD_REVIEWED 210 is set to FALSE. If the query finds a new ad, the operator first reviews the ad's greeting 1801 as found in the AD_GREETINGS table FIG. 3. If the ad was placed via telephone, this consists of listening to the ad's audio greeting. If the ad was placed via the Internet, this consists of reading the text greeting. The operator then determines if the greeting's contents are appropriate 1802. If the greeting's contents are inappropriate, the ad is deleted and the record purged from the database 1803 and the operator is returned to block 1800. If the greeting's contents are appropriate, the operator writes a twenty word summary of the greeting 1804. The operator then queries the database to determine if the advertiser recorded an e-mail address 1805. If an e-mail address audio recording is found, the operator transcribes the e-mail address 1806. The operator then updates the database 1807.

Specifically, the advertiser's twenty word text summary is stored to a disk file on the IWS. The AD_REVIEW_FLAG 210 in the AD_PERSONAL table FIG. 2 is set to TRUE indicating that the ad has been reviewed. In addition, a new record for the text summary is created in the AD_GREETINGS table FIG. 3 and the field GR_REVIEW_FLAG 303 set to TRUE indicating that the record has been reviewed. In the new record, the fields GR_MAILBOX_NUMBER 301, GR_TYPE 302, GR_FILENAME 304, GR_DATE_TIME 305 in the table AD_GREETINGS FIG. 3 are also populated to indicate the advertiser's mailbox number, the file format, and the location of the text file on the IWS, and the date and time. The field GR_TYPE is set to TEXT. Finally, the field GR_CONVERSION_FLAG 306 is set to TRUE to indicate that the text does not need to be converted to a different format.

The operator then returns to block 1800 to continue processing ads. If no new ads are found, the operator queries the database to determine if any multimedia files (audio, video, or photo) have been submitted via the Internet to enhance a personal ad 1808. Specifically, the query looks for all ads in the AD_PERSONAL table FIG. 2 where the field AD_REVIEWED 210 is set to TRUE that has files in the AD_GREETING_TABLE FIG. 3 where the GR_REVIEW_FLAG 303 is set to FALSE. If the query finds a multimedia file, the operator first reviews the file 1809. If it is an audio file, this consists of listening to the ad's audio greeting. If it is a video or graphic file, this consists of viewing the file. The operator then determines if the greeting's contents are appropriate 1810. If the greeting's contents are inappropriate, the filed is deleted and the record purged from the database 1811. The operator is then returned to block 1808 to continue processing multimedia files. If the file's contents are appropriate, the operator approves the file 1812 and updates the database 1813. Specifically, this consists in setting the field GR_REVIEW_FLAG 303 to TRUE to indicate that the file has been reviewed.

If the file is an audio file, the Operator Workstation converts the file to create a new RealAudio RA file and stores the file on the IWS. The Operator Workstation also converts the file to create a Dialogic VOX file and stores the file on the IVR. For each new audio file, a new record is created in the AD_GREETINGS table FIG. 2 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the audio file on the IVR Also, the field GR_REVIEW_FLAG 303 is set to TRUE to indicate that the file has been reviewed. Finally, the field GR_CONVERSION_FLAG is set to TRUE to indicate that the audio file does not need to be converted.

If the file is a video file, the Operator Workstation converts the Microsoft AVI file to create a new VDOLive file and stores the file on the IWS. Also, a new record is created in the AD_GREETINGS table FIG. 2 and the fields GR_MAILBOX_NUMBER 301, GR_TYPE 302, GR_DATE_TIME 305, and GR_FILENAME 304 are populated to indicate the mailbox number of the advertiser, the format of the file, the date and time, and the location of the video file on the IVR. Also, the field GR_REVIEW_FLAG 303 is set to TRUE to indicate that the file has been reviewed. Finally, the field GR_CONVERSION_FLAG 306 is set to TRUE to indicate that the video file does not need to be converted.

The operator then returns to block 1808 to continue processing multimedia files. If no new multimedia files are found, the session is terminated 1814.

Publishing Ads in the Newspaper

Each week, all the twenty-word summary text ads from personal ads submitted via telephone and via the Internet are published in a newspaper along with their five digit mailbox numbers. FIG. 8 depicts personal ads as they would appear in the local newspaper. Icons are included in each ad that represent the origin of an ad (via telephone or via the Internet) and what additional information or multimedia, if any, is available on the Internet. For example, an ad placed via the telephone contains a telephone icon 2001; an ad placed via the Internet contains a computer icon 2002. If there is additional text on the Internet, an ad contains an icon denoting additional text 2003. The presence of a photo or video clip is be indicated respectively by a still camera 2004 and video camera 2005 icons.

Responding to a Personal Ad Through a Telephone

Figure 9:
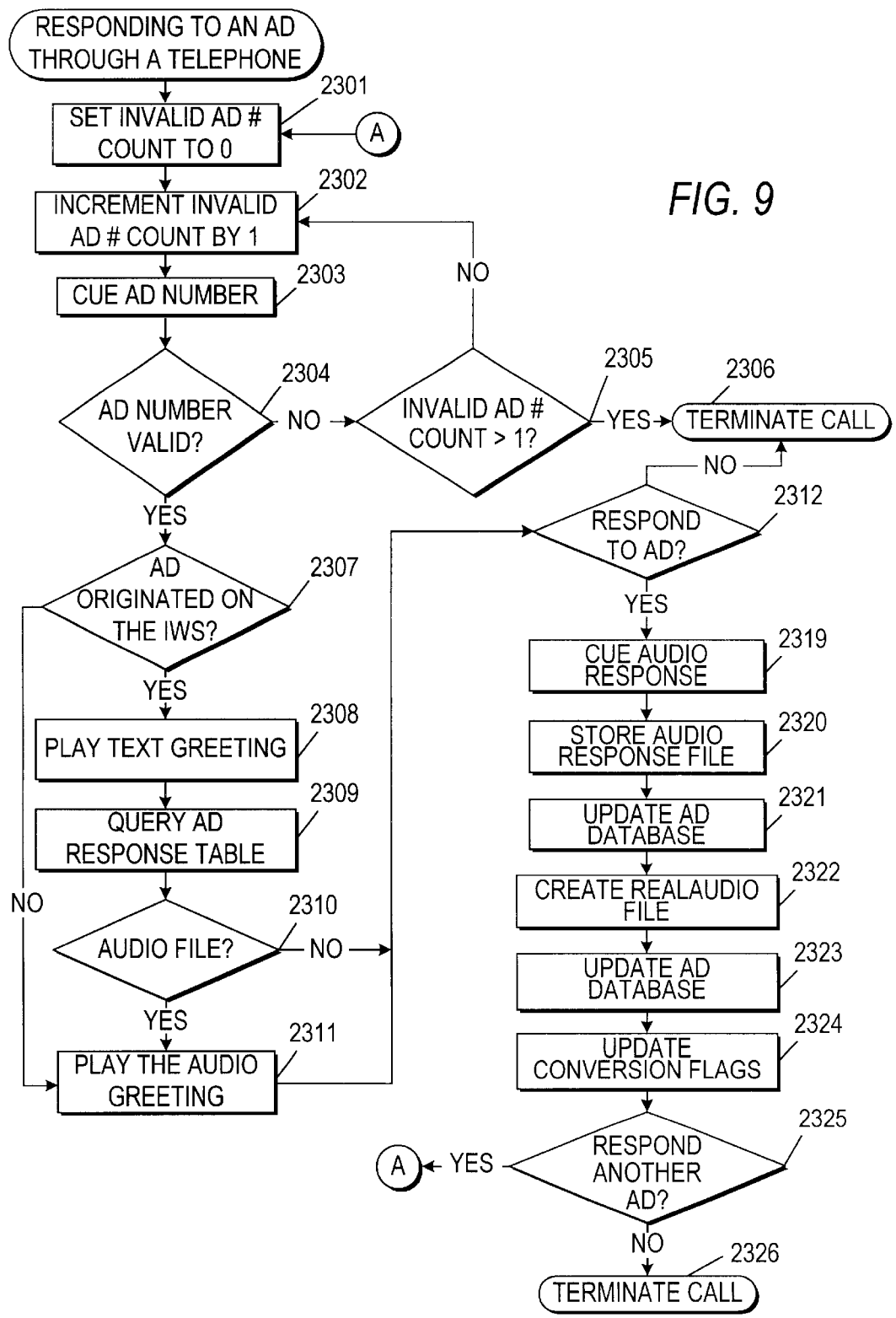
FIG. 9 shows a flow diagram of an exemplary operation of the process of responding to an ad through a telephone as accomplished by the present invention.

An exemplary operation of the system, with regard to a telephone caller responding to a personal advertisement will now be treated to accomplish the process as indicated in FIG. 9. First, suppose a telephone caller at terminal T1 places a call to respond to a personal ad advertised in XYZ newspaper. The assumed call involves the telephone caller actuating the buttons to input the number 1 900 777 3333, for example. As a result, signals are provided to the public telephone network resulting in a connection from the remote terminal T1 to the IVR. Using standard DNIS techniques, the IVR associates the called number 1 900 777 3333 with a specific format, for example, a voice personals response format.

Referring to FIG. 9, upon receiving a call, the IVR sets the "invalid mailbox number count" equal to zero 2301. The IVR then increments the "invalid mailbox number count" by one 2302 and cues the caller for a mailbox number 2303. Upon the caller entering a mailbox number, the IVR queries the field AD_MAILBOX_NUMBER 201 to determine if the mailbox number is valid 2304. If the mailbox number is invalid, the IVR determines if the caller has exceeded the maximum number of attempts allowed 2305. If the caller has exceeded the maximum number of attempts allowed, the call is terminated 2306. If the maximum number of attempts allowed has not been exceeded, the IVR increments the "invalid mailbox number count" by one 2302 and again cues the caller for a mailbox number 2303.

If the mailbox number is valid, the IVR queries the field AD_ORIGIN 211 to determine if the ad originated on the Internet 2307. If the ad originated on the telephone, the IVR plays the ad's audio greeting 2311. If the ad originated on the Internet, the IVR uses text to speech to play the ad's text greeting as placed on the Internet 2308. The IVR then queries the AD_GREETINGS table FIG. 2 to determine if the Internet advertiser also submitted an audio greeting 2309. If the query does not find an audio greeting 2310, the IVR prompts the caller to indicate if he wishes to respond to the ad 2312. If the query finds an audio greetings 2310, the IVR plays the audio greetings 2311. The IVR then prompts the caller to indicate if he wishes to respond to the ad 2312.

If the caller elects not to respond to the ad, the call is terminated 2306. If the caller elects to respond to the ad, the IVR next cues hint to record his response 2319. The IVR then stores the response to a disk file 2320 and updates the database 2321. Specifically the IVR creates a new record in the AD_RESPONSE table FIG. 4 populates the fields RSP_MAILBOX_NUMBER 501, RSP_DATE_TIME 503, RSP_TYPE 504, and RSP_FILENAME 505 to indicate the mailbox number of the ad responded to, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio must be converted from the Dialogic .VOX format to create a new audio file in the RealAudio .RA format for playback on the Internet.

The IVR creates a new RealAudio .RA file from Dialogic .VOX file and stores the RealAudio file to a disk file 2322 on the IWS and updates the database 2323. Specifically, the IVR creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date and time of the response, the format of the response, and the location of the response file on the IVR. The field RSP_TYPE 504 is set to RA to indicate that the audio recording is in the RealAudio .RA file format.

Finally, the field RSP_CONVERSION_FLAG 506 is set to TRUE for both the audiotex .VOX file and the RealAudio .RA file to indicate that the audio files do not need to be converted 2324.

The caller is then prompted to respond to another ad 2325. If the caller chooses to respond to another ad, the IVR continues processing at block 2301, otherwise the call is terminated 2326.

Responding to a Personal Ad Through the Internet

Figure 10:
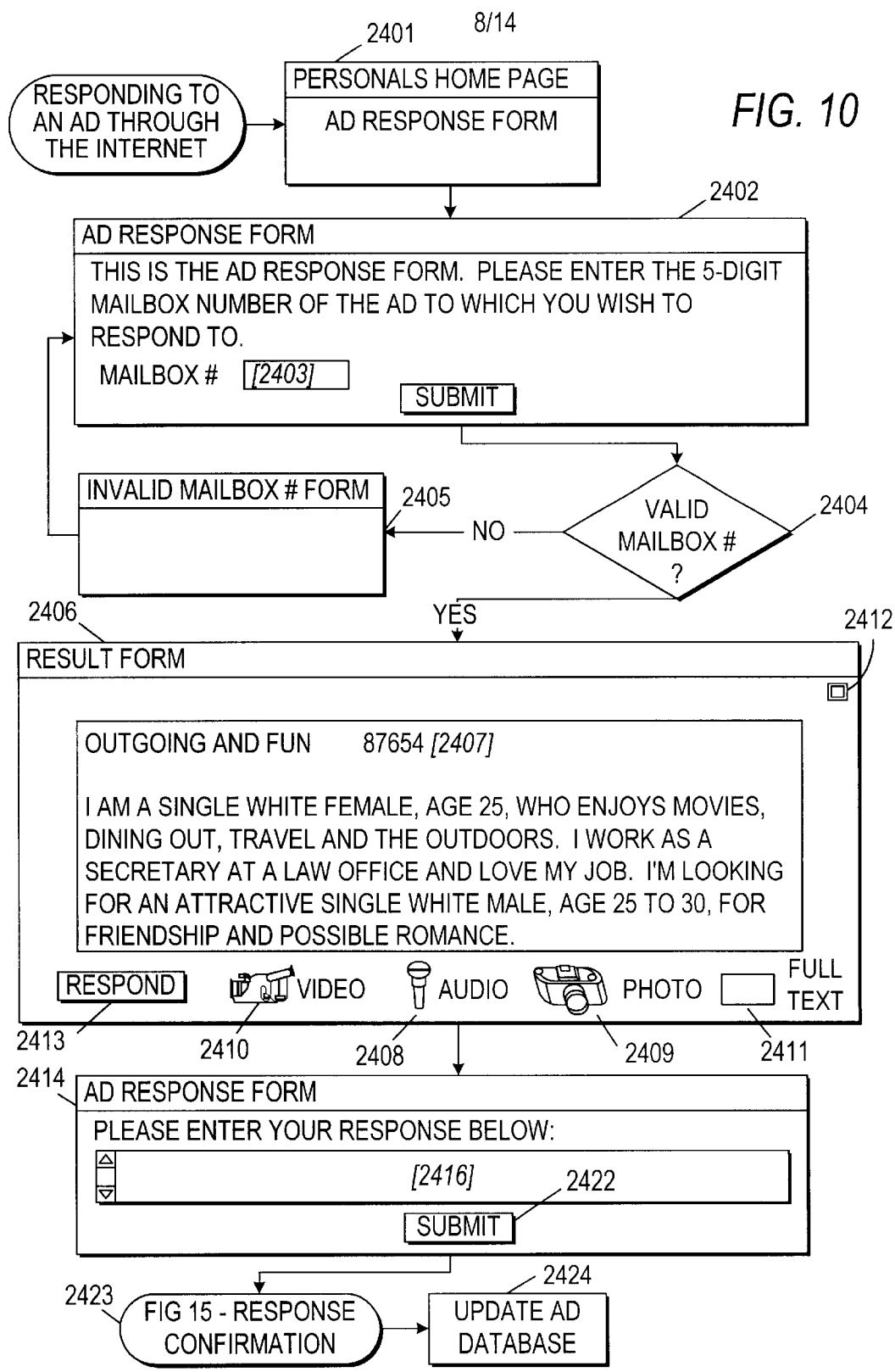
FIG. 10 shows a flow diagram of an exemplary operation of the process of responding to an ad through the Internet as accomplished by the present invention.

An exemplary operation of the system, with regard to a specific Internet user responding to a personal ad via the Internet will now be treated to accomplish the process as indicated in FIG. 10. First, suppose an advertiser at terminal CT1 connects to the Internet to respond to a personal advertisement advertised in XYZ newspaper. The assumed Internet user connects to the Internet and inputs a Uniform Reference Locator URL, for example: http://www.personal_ads.com, resulting in a connection from the remote terminal CT1 to a Home Page on the Internet Web Server.

Referring to FIG. 10, from the Home Page 2401 on the IWS, the Internet user selects an Ad Response Form 2402. The Ad Response Form instructs the Internet user to enter the five digit mailbox number of the ad she wishes to respond to 2403. Upon the Internet user entering her mailbox number, the IWS queries the field AD_MAILBOX_NUMBER in the Ad Database to determine if the mailbox number is valid 2404. If the mailbox number is invalid, the Internet user is presented with an Invalid Mailbox Number Form 2405.

Figure 11:
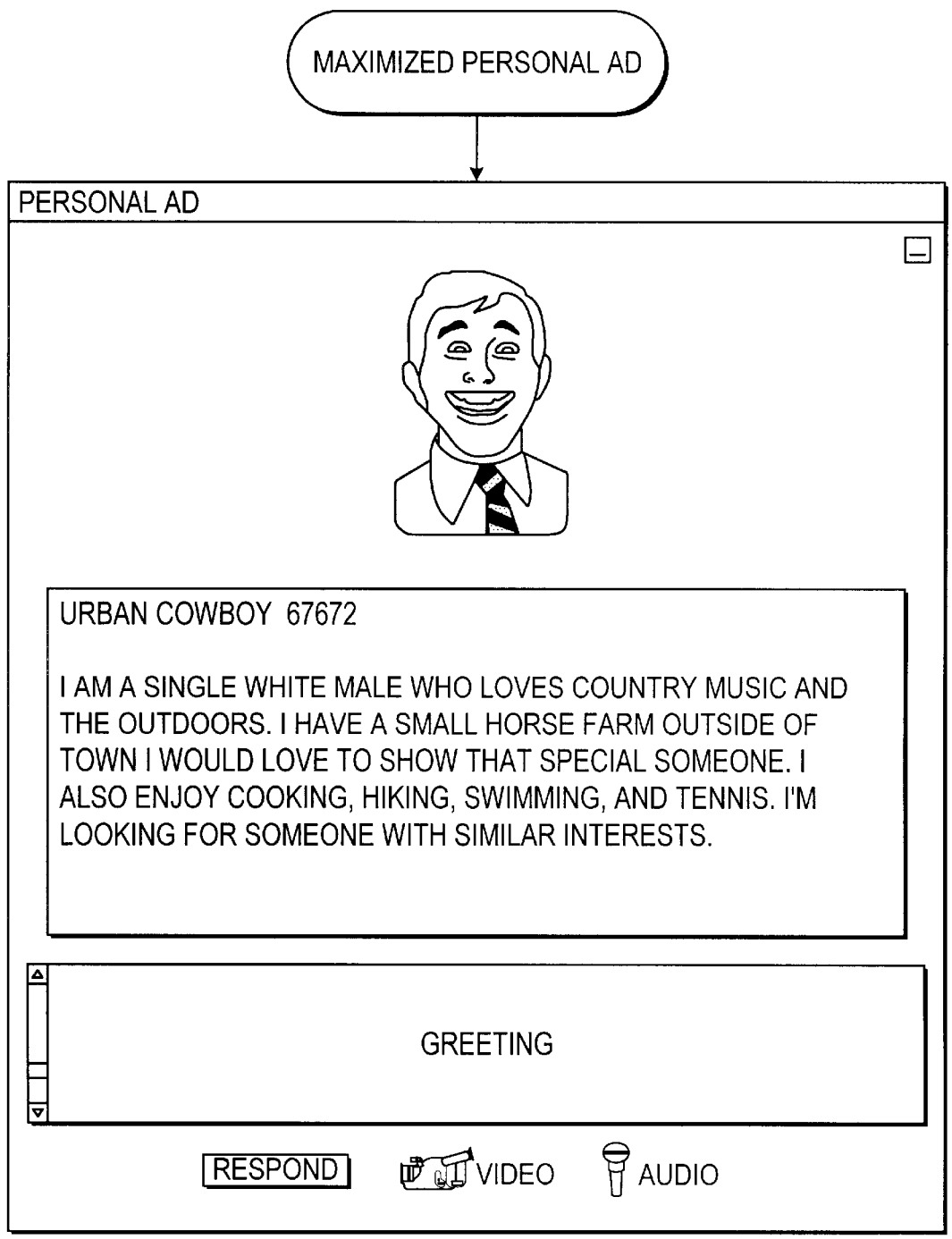
FIG. 11 shows a maximized personal ad as seen by the Internet user who chooses to expand the ad to full-page size.

If the mailbox number is valid, the IWS presents the Internet user with a Results Form 2406. The Results Form 2406 shows the ad the Internet user selected. Specifically, the Results Form shows the twenty word text ad that appears in the newspaper 2407. In addition, the ad contains one or more icons that represent any additional text or multimedia files (audio, video, photograph) for the ad that are available on the IWS. These icons include an audio icon 2408 to denote the ad's audio greeting, a still camera icon 2409 to denote a photograph of the advertiser, a video camera icon 2410 to denote a video clip of the advertiser, or a paper icon 2411 to denote the ad's full text greeting, if the ad was placed on the Internet. It is to be understood that these icons are merely representative and that many other possibilities exist to denote the existence of text and multimedia files. By clicking on an icon, the Internet user can view or listen to the associated file. In addition, by selecting a maximize bar 2412, the Internet user can expand an ad to full page size FIG. 11. The Internet user responds to an ad by selecting the "Respond" button 2413.

When the Internet user selects the respond button, she is presented with an Ad Response Form 2414. The Internet user creates a response by completing a response text field 2416. After completing the Ad Response Form, the Internet user submits the form by pressing the "Submit" button 2422. The advertiser is then presented with a Response Confirmation Form 2423. The Response Confirmation Form gives the advertiser information on enhancing her response with an audio message, photograph, or video clip.

The IWS then stores the response to a disk file and updates the database 2424. Specifically, the IWS creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format.

Enhancing a Response With Audio, Photograph and Video

Figure 12:
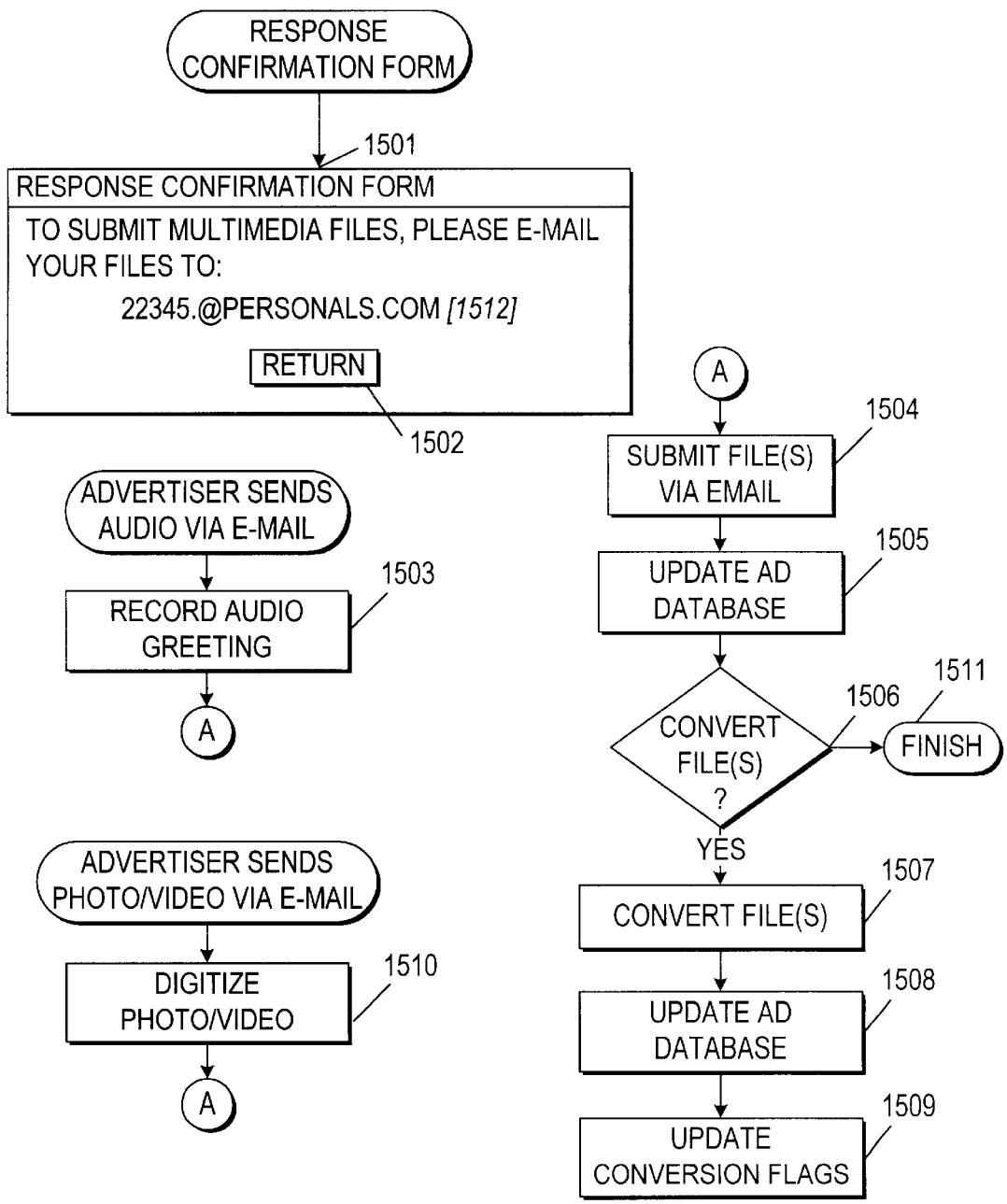
FIG. 12 shows a flow diagram of the response confirmation process, including the Response Confirmation Form which gives the Internet user instructions on how to enhance a response to an ad with, audio, video or a photograph.

As already indicated, after a text response has been submitted via the Internet, the Internet user is shown a Response Confirmation Form FIG. 12 1501. The response confirmation form gives the Internet user instructions on how to enhance a response to an ad with audio, video, or a photograph.

A more detailed explanation of how a respondent submits an audio response, photograph, or video clip via CT1 will now be given. To submit an audio response, the Internet user first makes an audio recording using a WAV file editor and then saves the file using her five digit mailbox number as the file name 1503, for example: 44567.wav. The Internet user then submits the audio file using e-mail to the recipient's electronic mailbox on the IWS 1504, for example: 22345@personals.com. The Internet user's audio response is stored to a disk file on the IWS and the AD Database is updated 1505.

Specifically, the IVR creates a new record in the AD_RESPONSE table FIG. 4 and populates the fields RSP_MAILBOX_NUMBER 501, RSP_DATE_TIME 503, RSP_TYPE 504, and RSP_FILENAME 506 to indicate the mailbox number of the ad responded to, the date of the response, the format of the audio file, and the location of the audio file on the IVR. The field RSP_TYPE 504 is set to WAV to indicate that the audio recording is in the Microsoft .WAV file format. Also, the field RSP_CONVERSION_FLAG 506 is set to FALSE to indicate that the audio file must be converted from the Microsoft .WAV format to create two new audio response files: one in the RealAudio .RA format for playback on the Internet, and another in the Dialogic .VOX format for playback via the telephone.

The IWS determines if conversion of audio files are needed 1506, and then creates a new RealAudio .RA file and Dialogic .VOX file from the Microsoft .WAV file 1507. The RealAudio file is stored on the IWS and the Dialogic file is stored on the IVR. The IWS also updates the Ad Database 1508. Specifically, for each new audio file, the IWS creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date of the response, the format of the response, and the location of the response file on the IWS. Finally, the field RSP_CONVERSION_FLAG 506 is set to TRUE for both the source audio file (.WAV) and the target audio files (.VOX and .RA) to indicate that the audio files do not need to be converted 1509.

To send a photograph in response to an ad, the Internet users first digitizes a photograph using a scanner or takes a photograph with a digital camera and then saves the image to a .GIF file using her five digit mailbox number as the file name 1510, for example: 44567.gif. The respondent then submits the graphic file using e-mail to the recipient's electronic mailbox, for example: 22345@personals.com 1504. The respondent's photo is stored to a disk file on the IWS and the database is updated 1505.

Specifically, the IWS creates a new record in the AD_RESPONSE table FIG. 4 and populates the RSP_MAILBOX_NUMBER 501, RSP_DATE_TIME 503, RSP_TYPE 504, and RSP_FILENAME 505 to indicate the mailbox number of the ad responded to, the date of the response, the file format of the photograph, and the location of the file on the IWS. The field RSP_TYPE 504 is set to GIF to indicate that the graphic file is in the .GIF file format. Finally, the field RSP_CONVERSION_FLAG 506 is set to TRUE to indicate that no file conversion is necessary as .GIF is the graphic file format used by the IWS 1506. It should be noted that file conversion may or may not be necessary depending on what file formats are supported by the IWS and IVR and what formats the system allows users to submit files in.

To send an advertiser a video clip, the Internet user first digitizes a video clip and then saves the image to a Microsoft .AVI file using her five digit mailbox number as the file name 1510, for example: 44567.avi. Other video formats such as Apple Quicktime, or MPEG video could also be used. The respondent then submits the graphic file using e-mail to the recipient's electronic mailbox, for example: 22345@personals.com 1504. The respondent's video is stored to a disk file on the IWS and the Ad Database is updated 1505.

Specifically, the IVR creates a new record in the AD_RESPONSE table FIG. 4 and populates the fields RSP_MAILBOX_NUMBER 501, RSP_DATE_TIME 503, RSP_TYPE 504, and RSP_FILENAME 505 to indicate the mailbox number of the ad responded to, the date of the response, the file format of the video clip, and the location of the video file on the IWS. Specifically, the field RSP_TYPE 504 is set to AVI to indicate that the audio recording is in the Microsoft .AVI file format. Finally, the field RSP_CONVERSION_FLAG 506 is set to FALSE to indicate that the VDOLive file must be converted to the VDOLive format for real time playback on the Internet.

The IWS determines that the video file must be converted to VDOLive format 1506. The IWS creates a new VDOLive file from the Microsoft .AVI file and stores the new file to a disk file 1507 on the IWS and updates the AD database 1508. A new record in the AD_RESPONSE table FIG. 4 is created and the IWS populates the RSP_MAILBOX_NUMBER 501, RSP_DATE_TIME 503, RSP_TYPE 504, and RSP_FILENAME 505 fields to indicate the mailbox number of the ad responded to, the date and time of the response, the format of the video file, and the location of the video file on the IWS. Finally, the field RSP_CONVERSION_FLAG 506 is set to TRUE for both record formats (AVI and VDOLive) in the database to indicate that the video file(s) does not need to be converted 1509.

Retrieving Responses Through a Telephone

Figure 13:
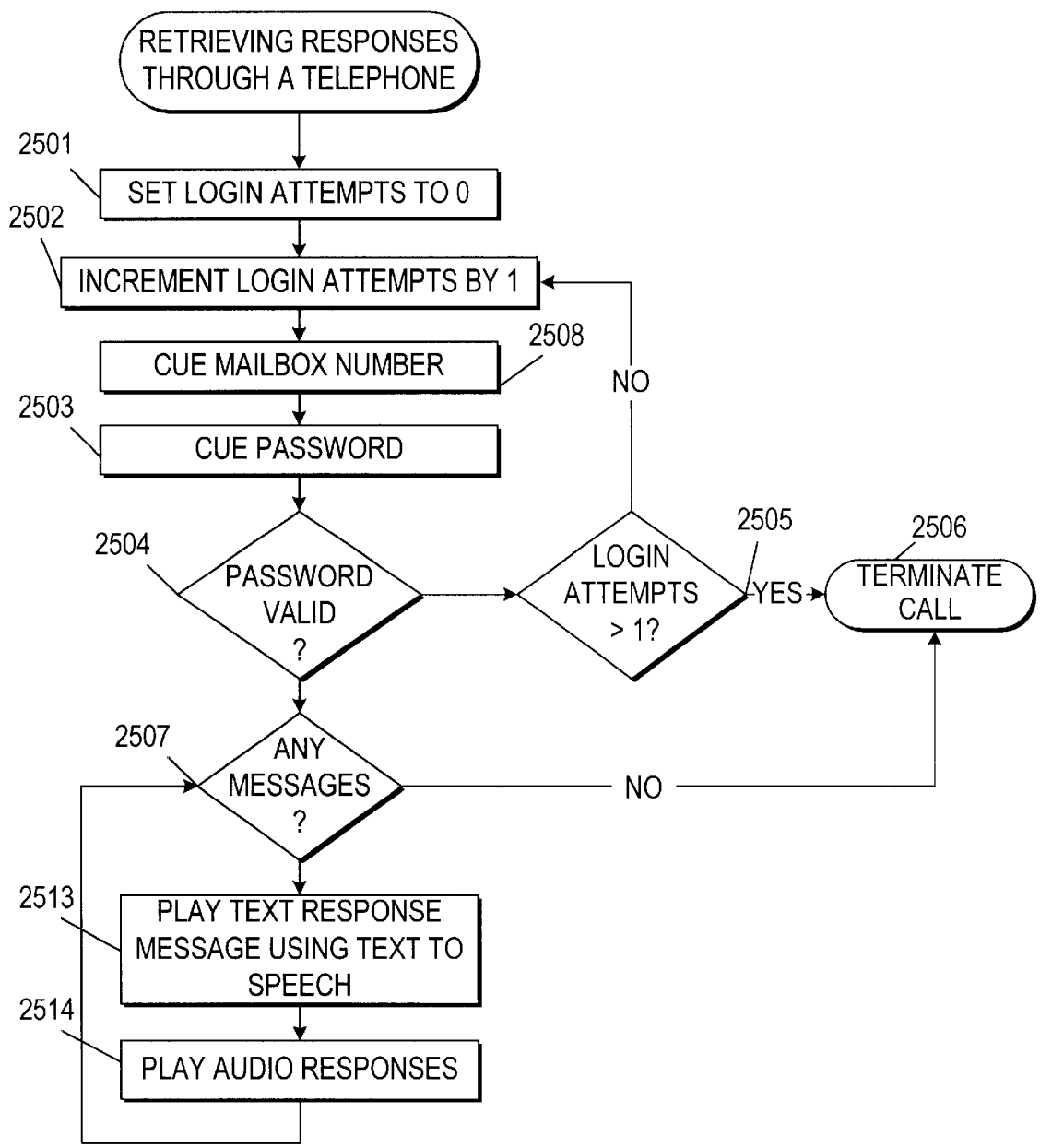
FIG. 13 shows a flow diagram of an exemplary operation of the process of retrieving responses through a telephone as accomplished by the present invention.

An exemplary operation of the system, with regard to an advertiser retrieving responses to his personal ad will now be treated to accomplish the process as indicated in FIG. 13. First, suppose an advertiser at terminal T1 places a call to retrieve messages left in response to his ad. The assumed call involves the advertiser actuating the buttons to input the number 1-900-777-4444, for example. As a result, signals are provided to the public telephone network resulting in a connection from the remote terminal T1 to the IVR. Using standard DNIS techniques, the IVR associates the called number 1 900 777 4444 with a specific format, for example, a message retrieval format.

Referring to FIG. 13, upon receiving a call, the IVR sets the "logon attempts" equal to zero 2501. The IVR then increments the "logon attempts" by one 2502 and cues the caller for a mailbox number and password 2503. The IVR then queries the AD Database to determine if the mailbox number and password are valid. If the entries are not valid, the IVR determines if the caller has exceeded the maximum number of logons attempts allowed 2505. If the caller has exceeded the maximum number of logon attempts allowed, the call is terminated 2506. If the maximum number of logon attempts allowed has not been exceeded, the IVR increments the "logon attempts" by one 2502 and again cues the caller for a mailbox number and password 2503.

If the entries are valid, the IVR then queries the AD_RESPONSE table to determine if the advertiser has any responses 2507. If the advertiser has no responses, the call is terminated 2506. If the IVR finds a response, the IVR plays the text 2513 and audio 2514 messages from the respondent. If a response is in text form, the IVR uses text to speech to play the message. If there are additional responses, the caller is returned to block 2513. Otherwise, the call is terminated 2506.

Retrieving Responses Through the Internet

Figure 14:
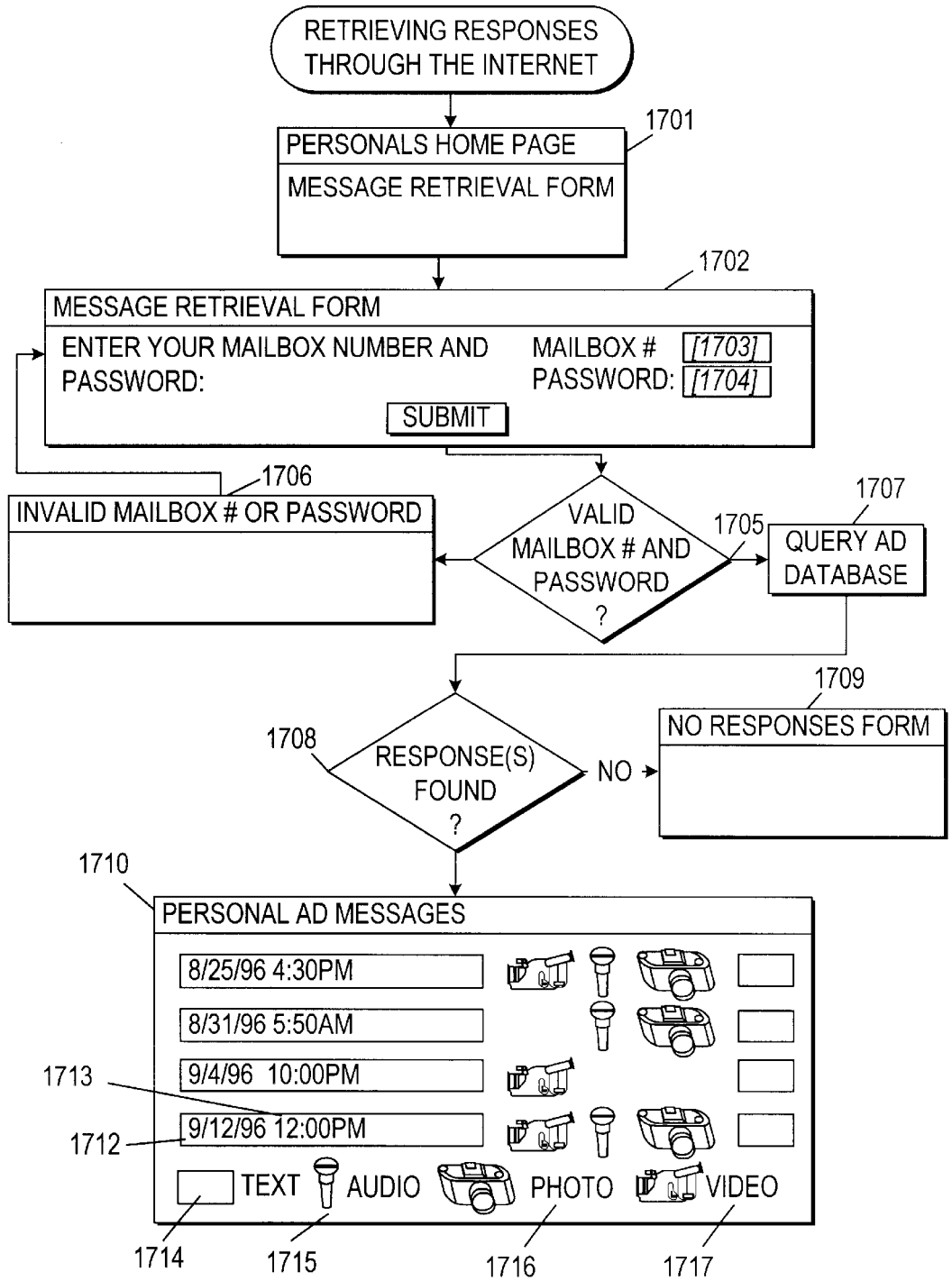
FIG. 14 shows a flow diagram of an exemplary operation of the process of retrieving responses through the Internet as accomplished by the present invention.

An exemplary operation of the system, with regard to an advertiser retrieving her responses via the Internet will now be treated to accomplish the process as indicated in FIG. 14. First, suppose an advertiser at terminal CT1 connects to the Internet to retrieve messages. The assumed Internet user connects to the Internet and inputs a Uniform Reference Locator URL, for example: http://www.personal_ads.com, resulting in a connection from the remote terminal CT1 to a Home Page 1701 on the Internet Web Server.

Referring to FIG. 14, from the Home Page 1701 on the Internet Web Server, the advertiser selects a Message Retrieval Form 1702. The Message Retrieval Form 1702 instructs the advertiser to enter a mailbox number 1703 and password 1704. The IWS then queries the AD Database to determine if the mailbox number and password are valid 1705. If the entries are not valid, the Internet user is presented with an Invalid Mailbox and Password Form 1706. If the entries are valid 1705, the IWS queries the Ad Database 1707 to find responses to the advertiser's ad.

If there are no responses, the IWS presents the advertiser with a No Responses Form 1709. If the IWS finds one or more responses, the IWS presents the advertiser with a Personal Ad Messages Form 1710. The Personal AD Messages Form 1709 shows any messages for the advertiser. Each message shows the date 1712 and time 1713 the message was received and contains one or more icons that represent the contents of the message. A text icon 1714 denotes a text message; an audio icon 1715 denotes an audio message; a still camera icon 1716 denotes a photograph; a video camera icon 1717 denotes a video clip. By clicking on an icon, the advertiser can view or listen to the associated file.

Searching for Personal Ads Through the Telephone

Figure 15:
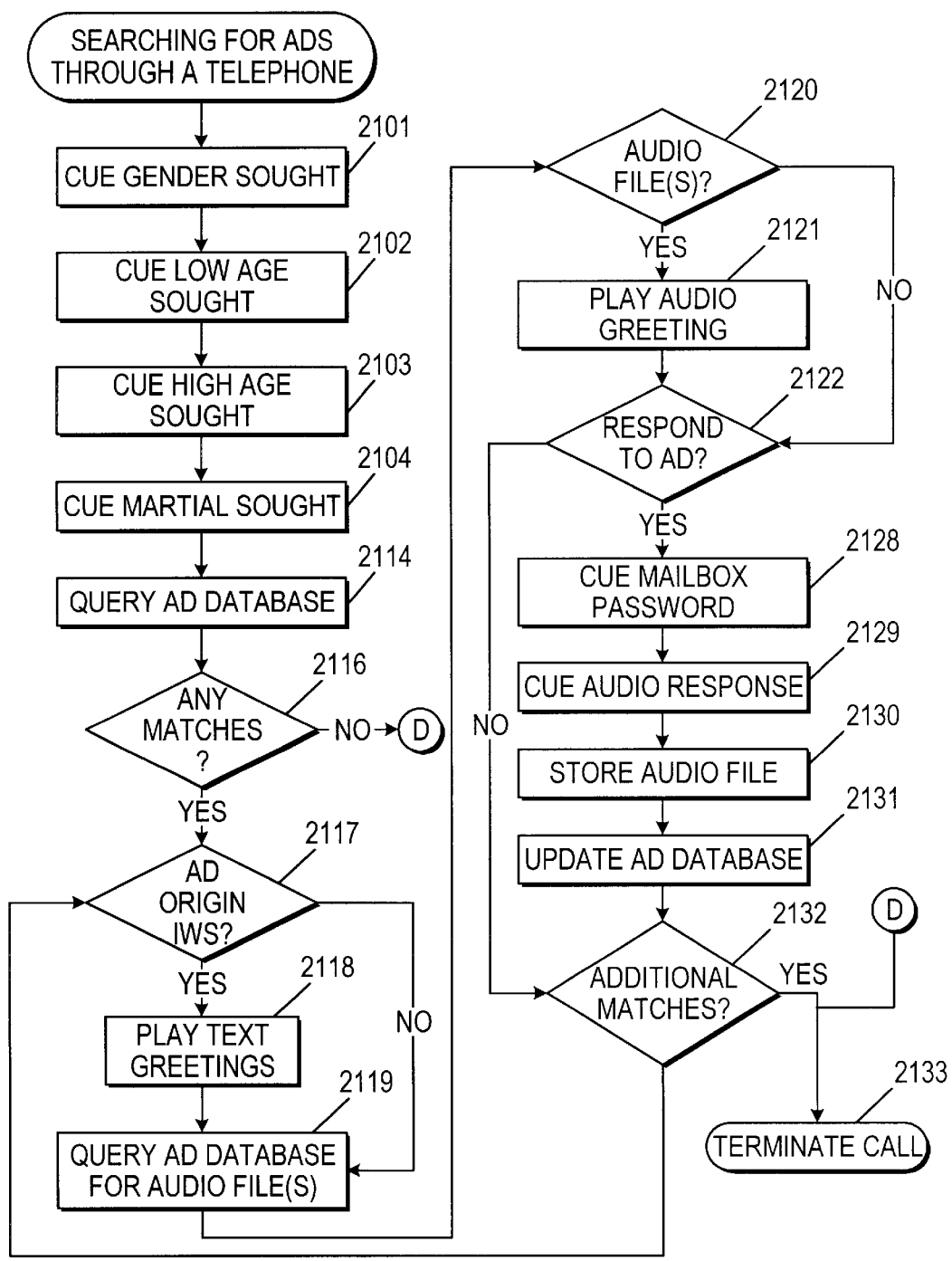
FIG. 15 shows a flow diagram of an exemplary operation of the process of searching for ads through a telephone as accomplished by the present invention.

An exemplary operation of the system, with regard to a specific telephone caller searching for personal ads will now be treated to accomplish the process as indicated in FIG. 15. First, suppose a telephone caller at terminal T1 places a call to search personal advertisements in response to an advertisement in XYZ newspaper. The assumed call involves the telephone caller actuating the buttons to input the number 1 900 555 6666, for example. As a result, signals are provided to the public telephone network resulting in a connection from the remote terminal T1 to the IVR. Using standard DNIS techniques, the IVR associates the called number 1 800 555 6666 with a specific format, for example, a voice personals ad searching format.

The caller is first prompted to indicate his preferences regarding the type of person he wishes to meet. Referring to FIG. 15, the IVR cues the caller to enter the gender of the person he wishes to meet 2101. Next, the IVR cues the caller to enter the lowest age of the person he wishes to meet 2102. Next, the IVR cues the caller to enter the highest age of the person he wishes to meet 2103. Finally, IVR cues the caller for the marital status of the person he wishes to meet 2104.

Next, the IVR queries the database to find ads that match the caller's preferences 2114. If the query does not find any ads, the call is terminated 2133. If the query returns one or more ads, the IVR queries the field AD_ORIGIN 211 to determine if the ad originated on the Internet 2117. If the ad originated on the telephone, the IVR plays the ad's audio greeting 2119. If the ad originated on the Internet, the IVR uses text to speech to play the ad's text greeting as placed on the Internet 2118. The IVR then queries the AD_GREETING_TABLE to determine if the Internet advertiser also submitted an audio greeting 2120. If the query does not find an audio greeting 2120, the IVR prompts the caller to indicate if he wishes to respond to the ad 2122. If the query finds an audio greetings 2120, the IVR plays tile audio greetings 2121. The IVR then prompts the caller to indicate if he wishes to respond to the ad 2122.

If the caller elects not to respond to the ad, the IVR determines if there are additional matches 2132. If the there are no additional matches, the call is terminated 2133. If there are additional matches, the caller is returned to block 2116.

If the caller elects to respond to the ad, the IVR next cues him to record his response 2129. The IVR then stores the response to a disk file 2130 and updates the database 2131. Specifically, a new record in the AD_RESPONSE table FIG. 4 is created and the IVR populates the RSP_MAILBOX_NUMBER 501, RSP_DATE_TIME 503, RSP_TYPE 504, and RSP_FILENAME 505 fields to indicate the mailbox number of the ad responded to, the date and time of the response, the format of the response, and the location of the response file on the IVR. The field RSP_TYPE 504 is set to VOX to indicate that the audio recording is in the Dialogic .VOX file format. Finally, the field RSP_CONVERSION_FLAG 506 is set to FALSE to indicate that the audio file must be converted from the Dialogic .VOX format to create a new audio file in the RealAudio .RA format for playback on the Internet.

The IVR creates a new RealAudio .RA file from Dialogic .VOX file and stores the RealAudio file to a disk file 2130 on the IWS and updates the database 2131. A new record in the AD_RESPONSE table FIG. 4 is created and the IVR populates the RSP_MAILBOX_NUMBER 501, RSP_DATE_TIME 503, RSP_TYPE 504, and RSP_FILENAME 505 fields to indicate the mailbox number of the ad responded to, the date and time of the response, the format of the response, and the location of the response file on the IVR. The field RSP_TYPE 504 is set to RA to indicate that the audio recording is in the RealAudio .RA file format. Finally, the field RSP_CONVERSION_FLAG 506 is set to TRUE for both files (.VOX and .RA) to indicate that the audio file does not need to be converted.

Next, the IVR determines if there are additional matches 2132. If there are no additional matches, the call is terminated 2133. If there are additional matches, the caller is returned to block 2116 to continue.

Searching for Ads Through the Internet

An exemplary operation of the system, with regard to a specific Internet user searching for personal ads via the Internet will now be treated to accomplish the process as indicated in FIG. 16. First, suppose an advertiser at terminal CT1 connects to the Internet to search for ads that match her preferences. The assumed Internet user connects to the Internet and inputs a Uniform Reference Locator URL, for example: http://www.personal_ads.com, resulting in a connection from the remote terminal CT1 to a Home Page on the Internet Web Server.

Referring to FIG. 16, from the Home Page 2201 on the IWS, the Internet user selects an Ad Searching Form 2202. The Ad Searching Form instructs the Internet user to indicate the gender 2203, low age 2204, high age 2205, and marital status 2206 of the person she wishes to meet. When the form is complete, the Internet users submits it by pressing the "Submit" button 2208. The IWS then checks the submitted form for completeness 2209. If the form is incomplete, the Internet user is returned to the Ad Searching Form 2202. If the form is complete, the IWS queries the database to find ads that match the Internet user's preferences 2210. If the query returns no matches 2212, the Internet user is presented with a No Matches Page 2213. If the query returns matches for one or more ads 2212, the IWS presents the Internet user with a Results Form 2214.

The Results Form 2214 shows the ads that match the Internet user's preferences. Specifically, the Results Form shows the twenty word text ad that appears in the newspaper 2215. In addition, each ad contains one or more icons that represent any additional text or multimedia files (audio, video, photograph) for the ads that are available on the IWS. These icons include an audio icon 2216 to denote the ad's audio greeting, a still camera icon 2217 to denote a photograph of the advertiser, a video camera icon 2218 to denote a video clip of the advertiser, or a paper icon 2219 to denote the ad's full text greeting, if the ad was placed on the Internet. It is to be understood that these icons are merely representative and that many other possibilities exist to denote the existence of text and multimedia files. By clicking on an icon, the Internet user can view or listen to the associated file. In addition, by selecting a maximize bar 2220, the Internet user can expand the ad to a full page size FIG. 11.

The Internet user responds to an ad by selecting the "Respond" button 2221. When the Internet user selects the respond button, she is presented with an Ad Response Form 2222. The Internet user creates a response by typing in a response text field 2225. After completing the Ad Response Form, the Internet user submits the form by pressing the "Submit" button 2230. The advertiser is then presented with a Response Confirmation Form 2231. The Response Confirmation Form gives the advertiser information on enhancing her response with an audio message, photograph, or video clip.

The IWS then stores the response to a disk file and updates the database 2232. Specifically, the IWS creates a new record in the AD_RESPONSE table FIG. 4 and then populates the fields RSP_MAILBOX_NUMBER 501, RSP_DATE_TIME 503, RSP_TYPE 504, and RSP_FILENAME 505 to indicate the mailbox number of the ad responded to, the date and time of the response, the format of the response, and the location of the response file on the IWS. The field RSP_TYPE 504 is set to TEXT. Finally, the field RSP_CONVERSION_FLAG 506 is set to TRUE to indicate that the text does not need to be converted to a different format.

The Internet user can then return to the Results Form at any time by using the "Back" key on her browser.

What is claimed is:

1. A method for providing a computer based advertising system, wherein said method comprises the steps of:
   receiving a plurality of audio recordings via the Internet;
   storing at least one of said audio recordings;
   playing at least one of said audio recordings via a telephone;
   sending an audio response message via a telephone; and
   transferring said audio response message to an Internet access location;
   isolating a subset of said audio recordings;
   wherein at least one of said audio recordings is received from an advertiser;

wherein at least one of said audio recordings describes an item or person available through said system.

2. A method according to claim 1, wherein said method further comprises the step of:

placing at least one of said audio recordings via the Internet;

wherein said placing is performed by said advertiser.

3. A method according to claim 1, wherein at least one of said audio recordings comprises the greeting of a personal advertisement.

4. A method according to claim 1, wherein said Internet access location comprises a web site.

5. A method according to claim 1, wherein said Internet access location comprises an e-mail account.

6. A method according to claim 1, wherein said method further comprises the step of:

retrieving said audio response message via the Internet.

7. A method according to claim 1, wherein DNIS is used to provide access to said playing or said sending.

8. A method according to claim 1, wherein said method further comprises the step of:

reviewing at least one of said audio recordings.

9. A method according to claim 1, wherein ANI is used to control access to said playing or said sending.

10. A method according to claim 1, wherein said method further comprises the steps of:

placing a text advertisement; and publishing said text advertisement;

wherein said placing is performed by said advertiser; and wherein said text advertisement is associated with at least one of said audio recordings.

11. A method for providing an Internet and telephone advertising system comprising the steps of:

placing a plurality of audio recordings via a telephone;

storing at least one of said audio recordings;

transferring at least one of said audio recordings to an Internet access location;

receiving a response message via the Internet;

retrieving said response message via a telephone; and isolating a subset of said audio recordings;

wherein at least one of said audio recordings describes an item or person available through said system; and wherein at least one of said audio recordings comprises the greeting of a personal advertisement.

12. A method according to claim 11, wherein said method further comprises the step of:

playing at least one of said audio recordings via the Internet.

13. A method according to claim 11, wherein said method further comprises the step of:

sending said response message via the Internet.

14. A method according to claim 11, wherein said response message comprises audio.

15. A method according to claim 11, wherein said response message comprises text.

16. A method according to claim 15, wherein said response message is retrieved using text-to-speech.

17. A method according to claim 12, wherein DNIS is used to provide access to said placing or said retrieving.

18. A method according to claim 11, wherein ANI is used to control access to said placing or said retrieving.

19. A method according to claim 11, wherein said method further comprises the steps of:

placing a text advertisement; and publishing said text advertisement;

wherein said text advertisement is associated with at least one of said audio recordings.

* * * * *